(12) United States Patent
Kaplan et al.

(10) Patent No.: US 7,672,913 B2
(45) Date of Patent: Mar. 2, 2010

(54) AUTOMATED ACTION-SELECTION SYSTEM AND METHOD, AND APPLICATION THEREOF TO TRAINING PREDICTION MACHINES AND DRIVING THE DEVELOPMENT OF SELF-DEVELOPING DEVICES

(75) Inventors: Frederic Kaplan, Paris (FR); Pierre-Yves Oudeyer, Paris (FR)

(73) Assignee: Sony France S.A., Clichy la Garenne (FR)

( * ) Notice: Subject to any disclaimer, the term of this patent is extended or adjusted under 35 U.S.C. 154(b) by 417 days.

(21) Appl. No.: 11/658,683

(22) PCT Filed: Jul. 26, 2005

(86) PCT No.: PCT/EP2005/008724

§ 371 (c)(1),
(2), (4) Date: Jan. 29, 2007

(87) PCT Pub. No.: WO2006/010645

PCT Pub. Date: Feb. 2, 2006

(65) Prior Publication Data

US 2008/0319929 A1    Dec. 25, 2008

(30) Foreign Application Priority Data

Jul. 27, 2004 (EP) .................................. 04291912

(51) Int. Cl.
*G06N 5/00* (2006.01)
(52) U.S. Cl. .......................................... 706/14; 706/12
(58) Field of Classification Search ............... 706/14, 706/12, 45; 434/350; 707/202
See application file for complete search history.

(56) References Cited

U.S. PATENT DOCUMENTS 6,473,851 B1 * 10/2002 Plutowski ....................... 713/1
6,606,479 B2 *  8/2003 Cook et al. .................. 434/350

(Continued)

OTHER PUBLICATIONS

Frederic Kaplan, et al., "Motivational Principles for Visual Know-How Development", Proceedings of the Third International Workshop on Epigenetic Robotics, XP 002329049, 2003.

(Continued)

*Primary Examiner*—Wilbert L Starks, Jr.
(74) *Attorney, Agent, or Firm*—Oblon, Spivak, McClelland, Maier & Neustadt, L.L.P.

(57) ABSTRACT

In order to promote efficient learning of relationships inherent in a system or setup S described by system-state and context parameters, the next action to take, affecting the setup, is determined based on the knowledge gain expected to result from this action. Knowledge-gain is assessed "locally" by comparing the value of a knowledge-indicator parameter after the action with the value of this indicator on one or more previous occasions when the system-state/context parameter(s) and action variable(s) had similar values to the current ones. Preferably the "level of knowledge" is assessed based on the accuracy of predictions made by a prediction module. This technique can be applied to train a prediction machine by causing it to participate in the selection of a sequence of actions. This technique can also be applied for managing development of a self-developing device or system, the self-developing device or system performing a sequence of actions selected according to the action-selection technique.

25 Claims, 11 Drawing Sheets

U.S. PATENT DOCUMENTS 6,738,753 B1 * 5/2004 Hogan .................. 706/12

OTHER PUBLICATIONS

Frederic Kaplan, et al., "Maximizing Learning Progress: An Internal Reward System for Development". Embodied Artificial Intelligence: International Seminar, XP 002329050, 2003.

Jürgen Schmidhuber, Institute of Electrical and Electronics Engineers: "Curious Model-Building Control Systems", Proceedings of the International Joint Conference on Neural Networks, vol. 2, XP 010054430, pp. 1458-1463, 1991.

Pierre-Yves Oudeyer, et al., "Intelligent Adaptive Curiosity: A Source of Self-Development", Proceedings of the Fourth International Workshop on Epigenetic Robotics, XP 002329051, 2004.

* cited by examiner

AUTOMATED ACTION-SELECTION SYSTEM AND METHOD, AND APPLICATION THEREOF TO TRAINING PREDICTION MACHINES AND DRIVING THE DEVELOPMENT OF SELF-DEVELOPING DEVICES

FIELD OF THE INVENTION

The present invention relates to the optimization of series of actions or trials which are performed in order to learn. More particularly, the invention is directed to an automated method and system for selecting which trials or actions should be tried next in order to achieve efficient learning.

The invention also relates to application of this technique in methods for training prediction machines, and to control the progress of active learning, or to organize the behaviour of, a self-developing device or system (e.g. a robot). The invention further relates to systems for training prediction machines using this technique and to systems applying this technique for controlling active learning or behaviour-organization in a self-developing device or system. The invention yet further relates to prediction machines trained using this technique and to self-developing devices applying this technique.

BACKGROUND OF THE INVENTION

There is a wide variety of applications in which it is necessary or useful to perform a series of actions on or affecting a setup or system S in order to acquire knowledge about the behaviour of the system S. The setup S can be a natural system or an artificial (man-made) system—use of the expression "setup" does not imply that the system has been actively organized or configured (although that could be the case). Often the desired "knowledge" consists in learning some relationship that holds between a set of the system's parameters. In general, it is desirable to minimize the number of actions that must be carried out.

In general, any setup or system S can be described in terms of its own current state and the state of an environmental context in which the system finds itself. The system's current state can be described in terms of values taken by a number of different parameters characterizing the system ("system-state parameters"). In a similar way, the system's environmental context can be described in terms of values taken by a number of different parameters characterizing that context ("context parameters"). In many cases it is not possible to determine clearly whether a given parameter is a system-state or context parameter. Indeed this distinction is immaterial as far as the operation of the present invention is concerned. According both kinds of parameter will be referred to herein as system-state/context parameters.

Actions can be taken which affect the system S. For example, it may be possible to control a parameter which affects the system S, so that this parameter takes a selected value. The controlled (or "tuned") parameter may be a system-state/context parameter but this is not obligatory. For a particular system S it is possible to select a set of parameters (or "action variables") whose values will be tuned in actions that are intended to elicit information about the behaviour of the system S.

The present invention concerns the selection of actions, affecting a system S, which are to be taken deliberately with a view to observing how the system reacts or behaves. In the present document, the expression "action" is not intended to imply a necessity for physical motion or the operation of an actuator; on the contrary, the expression "action" relates to the deliberate setting of a set of one or more action variables to respective particular values. In many cases the tuned variables will relate to a physical quantity (e.g. the amount of water to supply to a crop, the level of a voltage to apply to an electrode, etc.), but this is not a requirement of the present invention.

It is helpful to explain what is meant in the present document by the expression "system-state/context/action space".

Consider an application in which a user wishes to discover the relationships inherent in a setup S in which circuit boards are being photographed for quality control purposes. The circuit boards can have substrates made of different materials and, hence, can have different brightness values. The user wishes to discover how the exposure time and ambient illumination affect the contrast between the circuit boards and the conductive paths they carry, as observed in the photographic images. More particularly, he wishes to find out what conditions produce high-contrast images.

It is assumed that the photographic equipment includes a digital camera mounted over a conveyor which carries the circuit boards into a fixed position relative to the camera. An image-processing unit determines automatically the contrast between the circuit boards and the conductive traces they carry, by processing the image data generated by the digital camera. For simplicity, it is assumed that the image processing unit can accurately determine what within the image corresponds to the circuit board and what corresponds to the conductive traces.

This particular system S can be described in terms of the brightness of the circuit board substrate, BR, the ambient illumination, AI, and the exposure period, EP, at the time when the photographic images are generated. Only the exposure-period parameter EP can be set to different values under the user's control (or automatically), the other two parameters are considered to be outside the user's control. Thus the circuit board brightness, BR, and ambient illumination, AI, can be considered to be system-state/context parameters describing the system, and the exposure period EP can be considered to be an action variable whose value can be varied or "tuned".

It can be considered that these parameters AI, BR and EP define a multi-dimensional space which, in this simple case, is a three-dimensional space as illustrated in FIG. 1. In a more realistic example the multi-dimensional space is likely to have considerably more dimensions than three, however this would be difficult, if not impossible, to represent in a drawing.

The above-described multi-dimensional space defined by the system-state/context parameter(s) and action variable(s) of a system is referred to in the present document as "system-state/context/action space".

At any given moment, the above-mentioned example system can be described in terms of a vector defining the values taken by the circuit board brightness, BR, ambient illumination, AI, and the exposure duration, EP. FIG. 1 shows an example of a vector, A, corresponding to one particular combination of values of BR, AI and EP.

The cuboid shown in FIG. 1 corresponds to the system-state/context/action space for the contrast-measurement system S described above. It will be noted that FIG. 1 shows limits of 0 and 1 on the values of each system-state/context parameter and action variable. This represents the system-state/context/action space in the case where each of the system-state/context parameter values and action variable values is normalised so as to range from 0.0 to 1.0.

DESCRIPTION OF THE PRIOR ART

Various proposals have already been made in the field of statistics, and in the field of developmental robotics, with regard to how a series of trials or actions can be scheduled so as to optimize learning.

In the field of statistics, "optimal experiment design" seeks to determine how it is possible to minimize the number of examples that it is necessary to consider in order to achieve a given level of performance in generalization.

In the field of developmental robotics, one of the main goals is to produce robots which can develop. In this context "development" consists in a progressive increase in the complexity of the activities in which the robot can engage, with an associated increase in the robot's capabilities. As the robot develops, it can be said that the robot is engaged in "learning". In order to develop, the robot must explore its sensory-motor space; in other words, it must discover the consequences of performing given actions. For example, this could mean determining the visual changes which result from setting the speed of the robot's wheels to a particular value in a given environment (or from setting the joints in the robot's neck in a particular configuration, etc.). The way in which the robot explores the sensory-motor state-space is by performing a series of actions in a given context (or environment) and noting the perceived results. This set of interactions enables the robot to learn.

It is desirable to maximize the efficiency of robot learning, in other words to reduce the number of actions that the robot must perform in order to improve its capabilities to a particular extent. Randomly exploring the sensory-motor state-space would be immensely inefficient; to gain knowledge about its sensory-motor mapping, the robot needs to explore the sensory-motor state-space methodically.

In the field of developmental robotics, it has been found that the efficiency of robot learning can be improved by ensuring that the robot first tackles tasks that are relatively simple but then moves on to tackling tasks of progressively increasing difficulty. In general, humans control the situations or tasks encountered by the robot at a given time, ensuring that there is a progression towards tasks of increasing complexity. Thus the learning process can be described as "passive learning" or "passive development".

Currently, there is considerable interest in producing a mechanism to enable a robot (or other man-made system) to develop autonomously. In this case a learning process can be the engine of development. More particularly, it is desired to produce a robot (or other man-made system) which, when it encounters a complex, continuous, dynamic environment, is capable of determining, without pre-programmed knowledge, which tasks or situations in this environment have a complexity which is suited for efficient learning at a given stage in its development. A robot/man-made system of this type would learn easy parts of its sensory-motor mapping first of all and then progressively shift its focus of attention to situations of increasing complexity.

In the field of machine learning, various "active learning" proposals have been made as to how to choose actions which will provide a maximal gain in knowledge or "know-how". These proposals differ with regard to the manner in which "knowledge" and gains in knowledge are quantified. They differ, also, with regard to the way in which it is decided which action is liable to result in the maximal gain in knowledge. Some of the main known proposals are discussed below.

"Choose the Action which Gives the Least Predictable Result"

One approach was proposed by J. Denzler and C. Brown in "Information Theoretic Sensor Data Selection for Active Object Recognition and State Estimation" (see IEEE Transactions on Pattern Analysis and Machine Intelligence, 24, vol. 2, pp. 145-157, (2001)). This paper concerns a robotic system which selects its next action based indirectly on the output of a prediction module which produces predictions of the sensory consequences of a given candidate action. For example, the prediction module might predict that a particular predicted variable will take a value 2.0. A decision-making module evaluates the degree of certainty of the predictions produced by the prediction module (e.g. "the predicted value 2.0 will be correct 65% of the time) and selects, as the next action to perform, the candidate action for which the prediction module's prediction has the lowest degree of certainty.

In some applications this method can be efficient. However, in an environment which contains a random element, this approach can lead the robot to concentrate on taking actions which explore that random element (because it is maximally unpredictable). However, in general there is nothing useful to be learned by exploring a random element of this type. Thus, development of the robot will be side-tracked.

Moreover, techniques in which the certainties of predictions are evaluated are computationally expensive and cannot readily be implemented for continuous system-state/context/action spaces.

"Choose the Action which is Expected to Result in the Greatest Prediction Error"

Another approach was proposed by S. Thrun in "Exploration in Active Learning", in Handbooks of Brain Science and Neural Networks, ed. M. Arbib, MIT Press (1995). This proposal concerns another system which makes use of a prediction module which produces predictions of the consequences of a given candidate action. Once again, there is a module which evaluates the performance of the prediction module, this time by evaluating the prediction error that is expected to result from implementing a given candidate action. This decision-making module selects as the next action to be performed that candidate action for which it expects the greatest prediction error to arise.

This method can be implemented very efficiently and run in high-dimensional spaces in real-time on small robots. Moreover, it can be useful in controlled environments (e.g. when an artificial device is learning to navigate in a static environment). However, it is counter-productive in an uncontrolled non-deterministic environment because, once again, it can lead to a focus of attention on a random element in the environment.

"Choose the Action which Will Maximally Reinforce the Certainty of the Predictions which are Currently Uncertain"

A further technique was proposed by N. Roy and A. McCallum in "Towards Optimal Active Learning through Sampling Estimation of Error Reduction", in Proceedings of the 18th International Conference on Machine Learning (ICML-2001). This proposal arises in the statistical field of "optimal experiment design" and takes a probabilistic approach.

According to this technique, a robot contains a prediction module, arranged to predict the outcome of certain candidate actions. There is a further module which predicts the degree of certainty of these predictions. This further module is updated in a dynamic manner so that the reliability of the various predictions can become more certain. In this system, the candidate action which is selected for performance is the action which will lead to a maximum reinforcement of the certainty of the predictions for which the robot is currently unsure.

Unlike the above-described Denzler and Brown system, according to this technique the evaluation of a candidate action includes a step of predicting how the robot's knowledge will be changed, and how this will affect the certainties of its predictions. It will be seen, then, that in this system there is an attempt to evaluate the gain in knowledge that will arise from choice of a particular candidate action.

In an environment which contains a random element, this Roy and McCallum approach can avoid the situation where the robot is trapped in exploration of that random element. However, the robot needs to consider a certain minimum number of examples before it will determine that it is focusing on a random element (a part of the sensory-motor state-space or "system-state/context/action space" where its actions have no effect on the certainties of its predictions). Thus, time and computational resources are wasted on evaluating and performing actions which can lead to no useful gain in knowledge. This wasted time may be minimized in a system where the noise is independently normally distributed. However, that will not be the case in a non-controlled, realistic environment.

Furthermore, this method requires use of considerable computational resources and no efficient implementation exists for the case where the sensory-motor state-space (or, more generally, system-state/context/action space) is continuous.

"Choose the Action which (You Predict) Will Maximally Decrease Prediction Error"

An earlier active learning proposal by the present inventors is described in co-pending European patent application no. 03 291 359.2. According to this technique, a self-developing device contains a prediction module designed to predict the outcome of candidate actions, and a meta-prediction module which predicts the prediction errors that are associated with the different predictions made by the prediction module. The self-developing device updates the meta prediction module, and monitors its current level of prediction errors. The candidate action that is selected for performance is that action which, the meta prediction module predicts, will lead to the largest decrease in prediction error (possibly several time steps in the future).

The above-described technique has proved useful in certain situations, and successfully prevents a robot from focussing its attention on a random element in the environment. However, in some cases this technique can lead the robot to enter a loop in which it alternately focuses its attention on a first situation associated with a high prediction error rate, and a second situation associated with a low prediction error rate. For example, in the case of a robot moving in a space enclosed by walls, the robot would spend time alternately bumping randomly against walls (where the error rate of predicting what would happen next is high) and then stopping in front of the wall, looking at it (a situation in which it is simple to predict what will happen next).

SUMMARY OF THE INVENTION

In most systems, the behaviour of the system varies depending upon "where the system is" in system-state/context/action space. In other words, for different regions in the system-state/context/action space, different relationships exist between the various system-state/context parameters and/or action variables. Each different region in system-state/context/action space corresponds to a different type of situation in the system, S.

FIG. 2 illustrates the case where the system-state/context/action space of FIG. 1 can be divided into three regions in which respective different relationships hold between the ambient illumination, substrate brightness and exposure period. These three regions are labelled $R_1$, $R_{21}$ and $R_{22}$. The vector A, corresponding to one particular combination of values of the system-state/context parameters and action variable, has an end-point in region $R_1$.

As mentioned above, when investigating the behaviour of a setup S and trying to select which action affecting the setup should be performed next, it can be helpful to consider what learning progress can be expected to result from the performance of different candidate actions. The present inventors have realised that the best results are not obtained when learning progress is assessed based on analysis of the immediately-preceding series of actions that have been performed. Instead, it is advantageous to consider the previous actions of the same kind as the present one that have been performed when the setup was in a similar situation to the present one.

Clearly, it is necessary to have some way of determining which actions are "similar" to the presently-considered one and which situations are "similar" to the current situation. According to the present invention, action/situation pairs are judged to be similar to each other if they occupy the same region in system-state/context/action space. In other words, a situation A corresponding to system-state/context parameter and action variable values $SCA_A(t)$ and a situation B corresponding to system-state/context parameter and action variable values $SCA_B(t)$ will be considered to be "similar" if $SCA_A(t)$ and $SCA_B(t)$ define vectors having end-points in a common region of the sensory-motor state-space.

The above concept is illustrated in a highly-simplified form in FIG. 3 which shows three vectors, in the system-state/context/action space of FIG. 1 having three regions defined as in FIG. 2. In the system S, photographs can be taken in the situations A, B and C, corresponding to combinations of values of the system-state/context parameters and the action variable that are represented by $SCA_A(t)$, $SCA_B(t)$ and $SCA_C(t)$, respectively. According to the present invention, the situations A and B are considered to be similar to each other because the respective vectors representing the combinations of values of the system-state/context parameters and action variable when the system is in these situations A and B have end-points in a common region (region $R_1$ in FIG. 3).

On the other hand, situation C is not similar to either of situations A or B because the vector representing the corresponding combination of values of the system-state/context parameters and action variable when the system is in this situation C has an end-point in region $R_{21}$ of FIG. 3, which is different from the region $R_1$ containing the end-points of the vectors corresponding to situations A and B.

According to the present invention, it is considered to be advantageous to use different functions for assessing learning progress for situations in respective different regions of system-state/context/action space.

According to a first aspect thereof, the present invention provides an automated action-selection method and system for selecting which action affecting a setup S should be performed next when seeking to acquire knowledge efficiently about the behaviour of the setup S. By using the action-selection technique of the present invention, the number of actions that are required in order to gain knowledge about the behaviour of setup S can be reduced. Moreover, efficient learning can be achieved even in a complex, continuous, dynamic environment. Furthermore, the learning process does not become trapped in a loop between highly-predictable and highly-unpredictable situations, or become sidetracked into exploring a random element in the setup S.

Preferred embodiments according to a first aspect of the present invention provide an automated action-selection system and method which is capable of determining automatically which parts of system-state/context/action space should be explored next so as to match the complexity of the explored situation to the level of learning ("development") at the time.

The action-selection technique according to preferred embodiments of the first aspect of the present invention involves use of a prediction machine. More particularly, the prediction machine attempts to predict a respective value for each of a set of one or more variables, VAR, that is dependent on or affected by the behaviour of setup S. In order to select which action should be performed next, a set of possible next actions ("candidate actions") is evaluated. For each candidate action, the prediction machine predicts what respective value(s) it expects the predetermined set of variables VAR to take after this candidate action has been applied to the setup under investigation, taking into account the current state and context of that setup. A meta prediction machine then assesses how accurate it expects those predictions to be, notably by predicting what will be the prediction error.

One of the candidate actions is selected for performance so as to affect the setup S. After a selected action has been performed, feedback is received regarding the effect of this action on the setup's state and context parameters and on the values of the set of predicted variables (unless these values can already be derived from the observed values of the system-state/context parameters). This feedback is used to adapt the function applied by the prediction machine, whereby to improve the accuracy of its predictions. This feedback is also used by the meta prediction machine so as to improve the accuracy of its assessments in the future.

According to the present invention, an assessment is made of the gain in knowledge that is expected to result from performance of a given candidate action. In certain preferred embodiments according to the first aspect of the invention, this expected gain in knowledge is evaluated by determining what reduction in prediction error is expected to result from performance of this candidate action.

A particularity of the present invention is that the expected gain in knowledge is not evaluated by comparing the level of knowledge immediately before the selected candidate action has been performed with the expected level of knowledge immediately after performance of this action. On the contrary, the expected gain in knowledge is evaluated by comparing the expected level of knowledge after the selected candidate action with the level of knowledge that existed on one or more previous occasions when the setup had values of system-state/context parameters and action variables that are similar to those applicable at the time when the selected candidate action will be performed.

In other words, according to the present invention learning progress is assessed based on study of some parameter which indicates the system's level of knowledge, and the evolution of this "knowledge-indicator" parameter is evaluated "locally" (that is, in the region of system-state/context/action space which contains the current values of the system-state/context parameter(s) and action variable(s)).

Because the expected change in the value of the knowledge-indicator parameter is evaluated based on actual values of this knowledge-indicator parameter observed in a comparable situation to the present one, and not simply based on the immediately preceding values of the knowledge-indicator parameter, the technique of the present invention enables efficient learning to take place whilst avoiding becoming trapped in a loop between highly-predictable and highly-unpredictable situations. Moreover, the technique of the present invention manages to avoid focussing attention on situations which contain a random element (and which, hence, cannot give rise to the learning of general rules).

In preferred embodiments of the invention, a candidate action is considered to produce a large knowledge gain if performance of this action is expected to cause a large decrease in prediction error. In other words, a prediction is made related to performance of a candidate action, and the expected prediction error is computed. The expected prediction error for this candidate action is compared with actual prediction error values observed when this kind of action was performed previously in similar circumstances to the present ones (that is, when the values of system-state/context parameter(s) and of the action variable(s) were in the same region of system-state/context/action space as they are now).

Once a candidate action is selected for performance, and has been performed, the data defining this action, the system-state/context parameters when this action was performed and the consequences of performance of this action (in terms of the observed values of the set of predicted variables, VAR) can be considered to constitute a "training example".

Each training example can be represented using a multi-dimensional vector having as its different components the respective values of each system-state/context parameter at the time when this action was performed, the respective values of each action variable defining this action, and the respective values of each of the set of variables VAR that were observed as a result of performance of this action. According to this representation, each training example can be considered to be an association of two vectors, the first one defining the position of this training example in system-state/context/action space and the second defining the location of this training example in "outcome space" (that is, a space whose dimensions correspond to the actual values of the different predicted variables VAR).

According to the preferred embodiments of the action-selection technique according to the first aspect of the invention, it is preferable to divide system-state/context/action space into regions in a progressive manner: starting by dividing the whole space up into a single region (or small number of regions) and then sub-dividing that region (or those regions) later on.

As actions are selected and performed, training examples are accumulated. The training example data is stored in association with the region in system-state/context/action space which contains the end-point of the vector defining this training example. When a decision is taken to divide a region of system-state/context/action space into two or more new regions, the training examples that previously were associated with the original region become assigned to one or other of the new regions. Thus, at a given moment each training example is associated with only one region.

According to the preferred embodiments of the action-selection technique according to the first aspect of the invention, a given region of system-state/context/action space will be sub-divided into two (or more) smaller regions when a first criterion is met. According to one example of this first criterion, sub-division of a region, R, will take place when it is determined that the latest training example is the $N^{th}$ training example having a combination of system-state/context parameters and action variables which falls within this region R (with N being a predetermined number).

Preferably, when a region, R, is sub-divided into two or more smaller new regions, the boundaries separating the new regions from each other will be set based on a second criterion. According to one example of this second criterion, the region boundaries are set so as to minimize the variance in "outcome space" of the locations of the training examples which are assigned to the same new region of system-state/context/action space (whilst keeping a balance between the numbers of training examples located in the new regions of system-state/context/action space).

It will be seen that as system-state/context/action space is sub-divided in this progressive manner a tree structure builds up: the initial region can be considered to be the root, the sub-divisions of this initial region constitute the branches, sub-divisions of those sub-divisions constitute twigs, etc. A region at the end of a given chain of sub-divisions can be considered to be a "leaf".

When an action is selected and performed, the action-selection system according to the preferred embodiment of the first aspect of the invention receives feedback enabling it to determine the actual prediction error that occurred. The actual prediction error data will be stored in relation to a particular region of system-state/context/action space, namely that region corresponding to the combination of values of system-state/context parameters and action variable(s) applicable at the time when the prediction was made. The size of this region will depend upon whether this combination of values is located in a part of system-state/context/action space that has been highly sub-divided or barely divided at all.

In the action-selection technique according to the first aspect of the invention, it has been found to be advantageous if, every so often, there is a random selection of the next action. In other words, on a majority of occasions the next action will be selected so as to maximise the expected knowledge gain (evaluated locally) but, on a minority of occasions, there will be a random selection of one of the candidate actions.

According to a second aspect, the present invention provides a system and method for training a prediction machine. The prediction machine is trained by causing it to participate in the selection of a series of actions using the action-selection technique according to the first aspect of the invention.

In the prediction-machine training method according to preferred embodiments of the second aspect of the present invention, for each of a set of candidate actions which can be taken to affect a setup S, the prediction machine attempts to predict what would be the value of a set of variables, VAR, if that candidate action were to be performed (the respective values of the set of variables VAR being dependent on or affected by the behaviour of the setup S and the setup S being describable in terms of a number of system-state/context parameters). A meta prediction module evaluates the expected accuracy of the prediction (expected prediction error), and a knowledge-gain assessment module assesses what reduction in prediction error would result from performance of the candidate action. The expected knowledge-gain is assessed by comparing an indicator of prediction error expected to occur if this action is performed with a comparable indicator of the actual prediction error that existed on one or more previous occasions when the setup had a combination of values of system-state/context parameters and action variables that is similar to that applicable at the time of the current experiment.

According to the prediction-machine training technique of the second aspect of the invention, system-state/context/action space is divided up into regions in a dynamic manner. The prediction, meta prediction and knowledge-gain assessment are made separately for each region and, as the series of actions progresses (the number of training examples increases), they become better and better adapted to suit the properties of their assigned region. For each candidate action, the expected knowledge gain is assessed using a prediction function, meta prediction module and knowledge-gain assessment module assigned to the region in system-state/context/action space corresponding to that candidate action and the current input values of the system-state/context parameters.

An action-selection module selects one of the candidate actions for performance. On a majority of occasions the selected candidate action is the one which is expected to produce the greatest reduction in prediction error (as assessed "locally" in system-state/context/action space). The selected action is performed, feedback is received enabling the actual prediction error to be determined, and the operation of the prediction machine modules assigned to the relevant region in system-state/context/action space is modified taking into account the received feedback.

Once the prediction machine has been trained, in a sequence of actions selected using the action-selection technique of the present invention, it can be considered to be programmed with the relationships inherent in the setup S. Such a trained prediction machine has commercial value in its own right, in view of the fact that it can be used to predict how the setup S will behave for a given combination of values for the state and context parameters, and under the effect of different actions. Assuming that the setup S has parameters which are related to one another in a non-random fashion, this prediction will tend to be accurate because the prediction machine has already learned the relationships that hold between the system parameters.

Thus, the second aspect of the present invention also provides a prediction machine trained according to the above-described prediction-machine training technique.

The action-selection technique and prediction-machine training technique of the first and second aspects of the present invention can be implemented using purpose-designed hardware or using suitably-programmed general-purpose computers. In either case, it is necessary to configure the purpose-designed machine/programmed computer so that it knows what are the system-state/context parameters applicable to the setup S that is to be investigated, what actions can be taken affecting the setup S, notably what are the action variables which can be tuned (and what are the possible tuning values or ranges), and what variables(s) (VAR) should be predicted.

The necessary configuring can be performed by the manufacturer before supplying the purpose-designed machine, computer program or programmed general-purpose computer to the end-user. Alternatively, the purpose-designed machine, computer program, or programmed computer can be supplied to the end-user in a general state, allowing the user to identify what are the system-state/context parameters, action variables and predicted variable(s) (VAR) applicable to the setup he wishes to investigate. In the latter case, it may be possible for the user to re-initialise the purpose-designed machine/programmed computer so that he can input new system-state/context parameters, action variables and predicted variables in order to investigate a different setup.

After the initial configuration phase, a user, U, wishing to learn about the behaviour of a setup S, or to train the prediction machine to learn the behaviour of setup S, can input to the purpose-designed machine/programmed computer the current values of the system-state/context parameters. The purpose-designed machine/programmed computer will then indicate which action should be taken now. In suitable cases, the purpose-designed machine/programmed computer may automatically cause the selected action to be performed. Otherwise, the purpose-designed machine/programmed computer may simply indicate to the user which action should be taken next.

Once the selected action has been performed, the user inputs to the purpose-designed machine/programmed computer updated values of the system-state/context parameters and (if need be) the actual values of the set of predicted variables, and the purpose-designed machine/programmed computer will then determine what action should be performed next (what values should be assigned to the one or more action variables). Thus, the action-selection technique and prediction-machine training technique of the invention determine the sequence of actions that are performed affecting the setup S. This will enable the user or prediction machine to acquire knowledge about the setup S in a structured and efficient manner, reducing the number of actions that are required.

The action-selection technique and prediction-machine training technique according to the first and second aspects of the present invention are not limited to the case where a user (human or robot) inputs the current values of the system-state/context parameters and provides feedback on the consequences of performance of each action. In appropriate cases, the inputting of system-state/context parameter values and providing of feedback will be performed automatically, for example by sensors coupled to the purpose-designed hardware/programmed computer implementing the technique according to the invention.

According to a third aspect of the present invention, the above-described action-selection technique can be applied as a mechanism for driving the development of, or managing learning by, a robot or other self-developing device or system. More particularly, the third aspect of the present invention uses the action-selection technique of the first aspect of the invention to decide a sequence of actions to be performed by a self-developing device or system. The self-developing device or system performs the selected actions and provides feedback enabling the consequences of the action to be determined.

Preferred embodiments of the third aspect of the invention provide a decision-making module for a self-developing device or system. This decision-making module determines which action should be performed next by the self-developing device or system in order to promote efficient learning by that device or system and/or to achieve a desired organization of the behaviour thereof. The decision-making module is capable of determining for itself which parts of its system-state/context/action space should be explored next so as to match the complexity of the explored situation to the self-developing device or system's level of development at the time. The decision-making module can be integrated into the self-developing device or system itself, or can be physically separate from, but in communication with, that device or system.

The third aspect of the present invention enables active learning of complicated non-deterministic mappings in an efficient manner. Application of this approach by a robot (or other self-developing device or system) leads to organization of the robot's behaviour such that the robot selectively chooses the focus of its action (and "attention") in a manner leading to autonomous scaling of the complexity of the learning situations it encounters. The ability to organize the behaviour of a self-developing device or system in this way is an important achievement.

The method according to the third aspect of the present invention constitutes a drive motivating the selection of actions by a self-developing device or system. This drive can be termed "Intelligent Adaptive Curiosity". This drive can be termed "intelligent" because the action-selection method ensures that the self-developing device avoids situations that are overly predictable or overly unpredictable. This drive can be termed "adaptive" because the situations which will be attractive to the self-developing device change over time. This drive can be designated as "curiosity" because it maximizes learning progress, thereby pushing the self-developing device towards exploration of novel situations (where things can be learnt).

In many cases this "Intelligent Adaptive Curiosity" drive will be one of several drives motivating the behaviour of a self-developing device or system. For example, in a robot there may be a number of drives relating to maintenance of the robot's viability: for example, temperature maintenance, energy maintenance, maintenance of physical integrity, etc.

There are a wide variety of techniques allowing these different, and often competing, drives to be integrated with each other: for example, simple weighting of the different drives; allocation of reward functions to each drive and determination of the overall reward associated with a proposed action; etc. The technical literature in this field can be consulted for further examples. In a context where the method according to the third aspect of the present invention constitutes one of a number of drives motivating the behaviour of a self-developing device, the invention can be applied regardless of which technique is selected for integrating the different drives.

Further features and advantages of the various aspects of the present invention will become clear from the following description of preferred embodiments thereof, given by way of example, illustrated by the accompanying drawings, in which.

Figure 1:
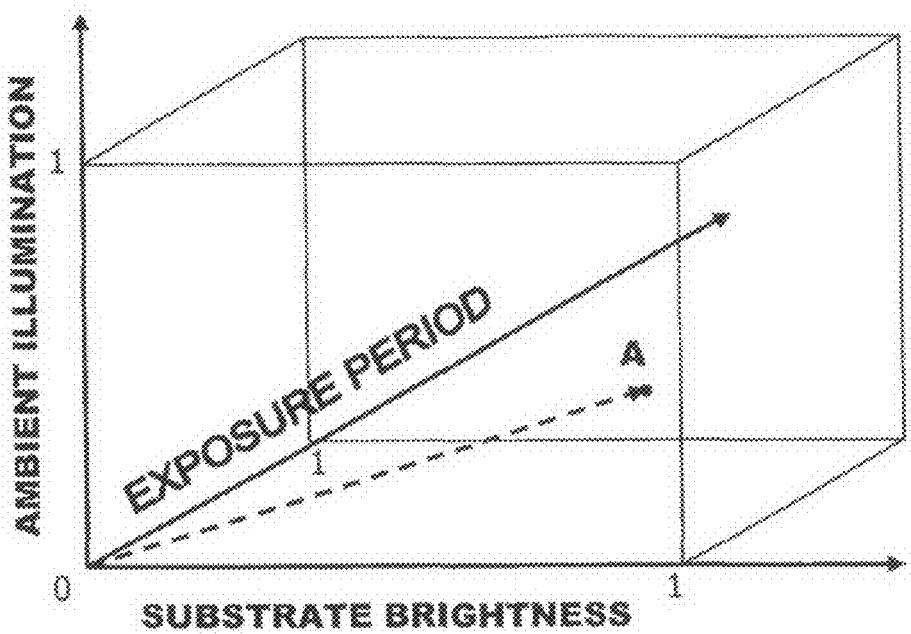
FIG. 1 is a graph illustrating a multi-dimensional "system-state/context/action" space applicable to a simple setup or system, S.
Figure 2:
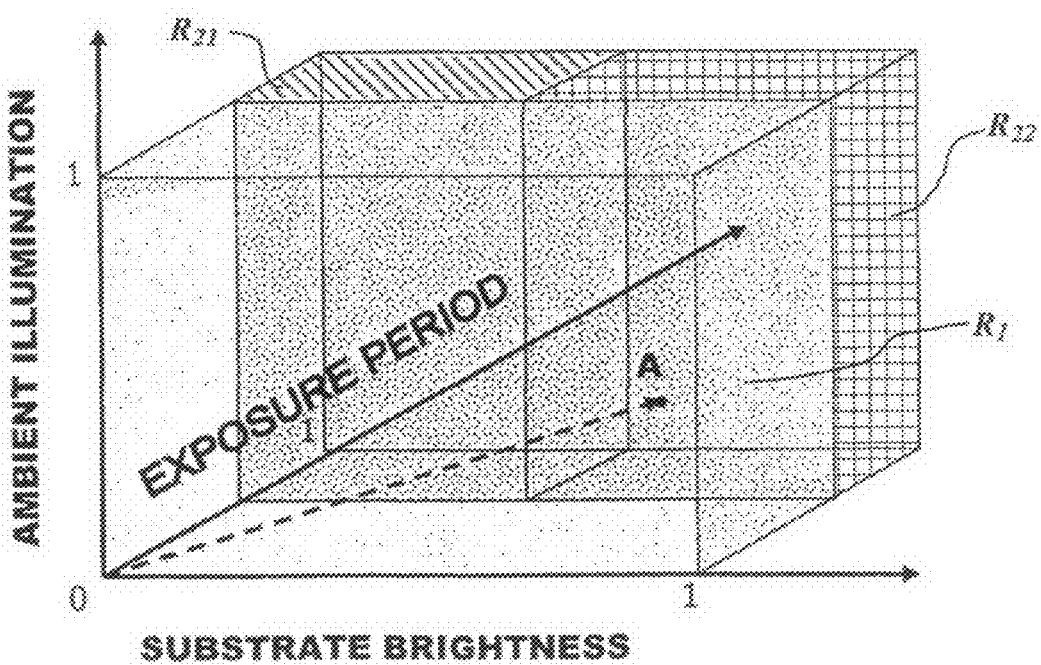
FIG. 2 is a graph illustrating different regions in the system-state/context/action space of FIG. 1.
Figure 3:
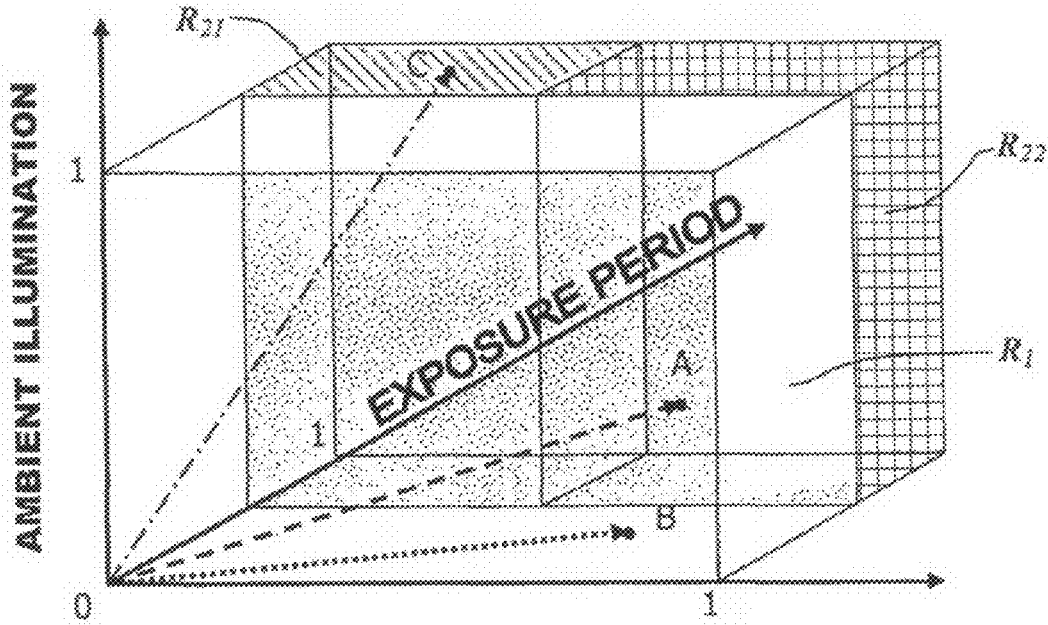
FIG. 3 is a graph illustrating different vectors in the system-state/context/action space of FIG. 1.
Figure 8:
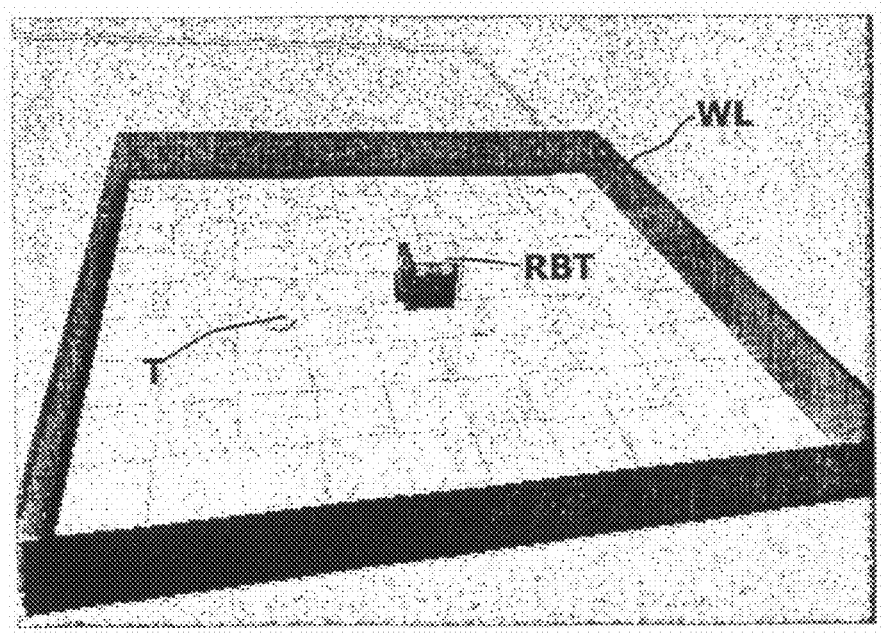
FIG. 8 is a schematic representation of an experimental set-up, involving a simple robot, used to test an embodiment according to the third aspect of the present invention.
Figure 16:
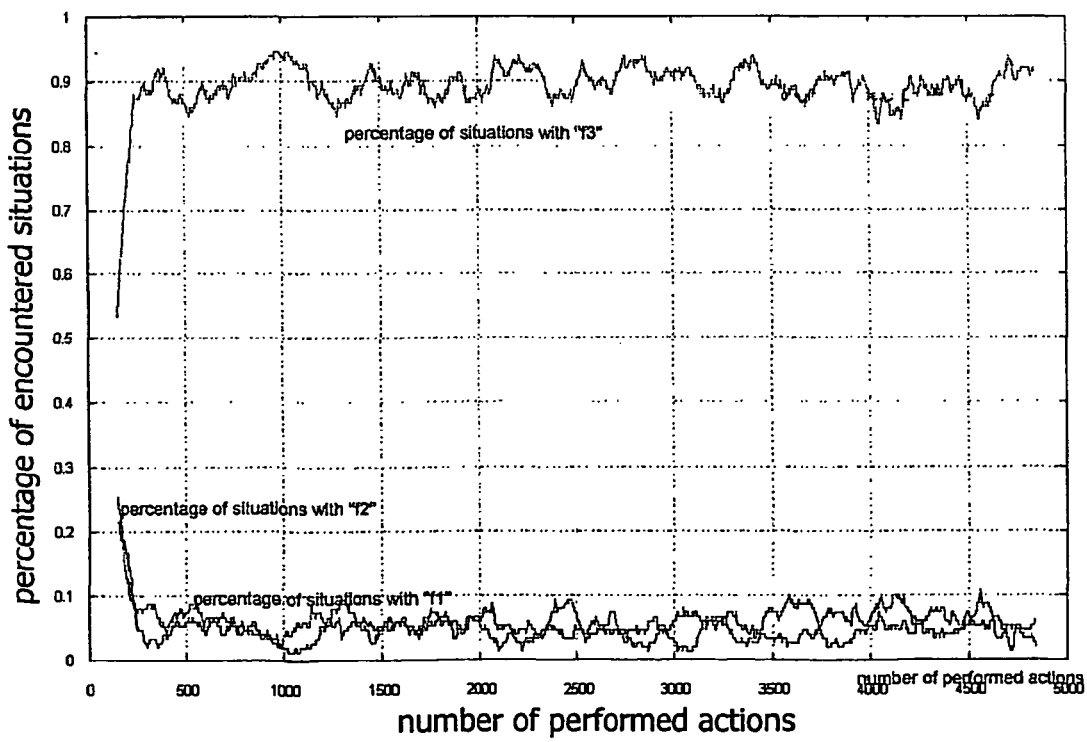
Figure 17:
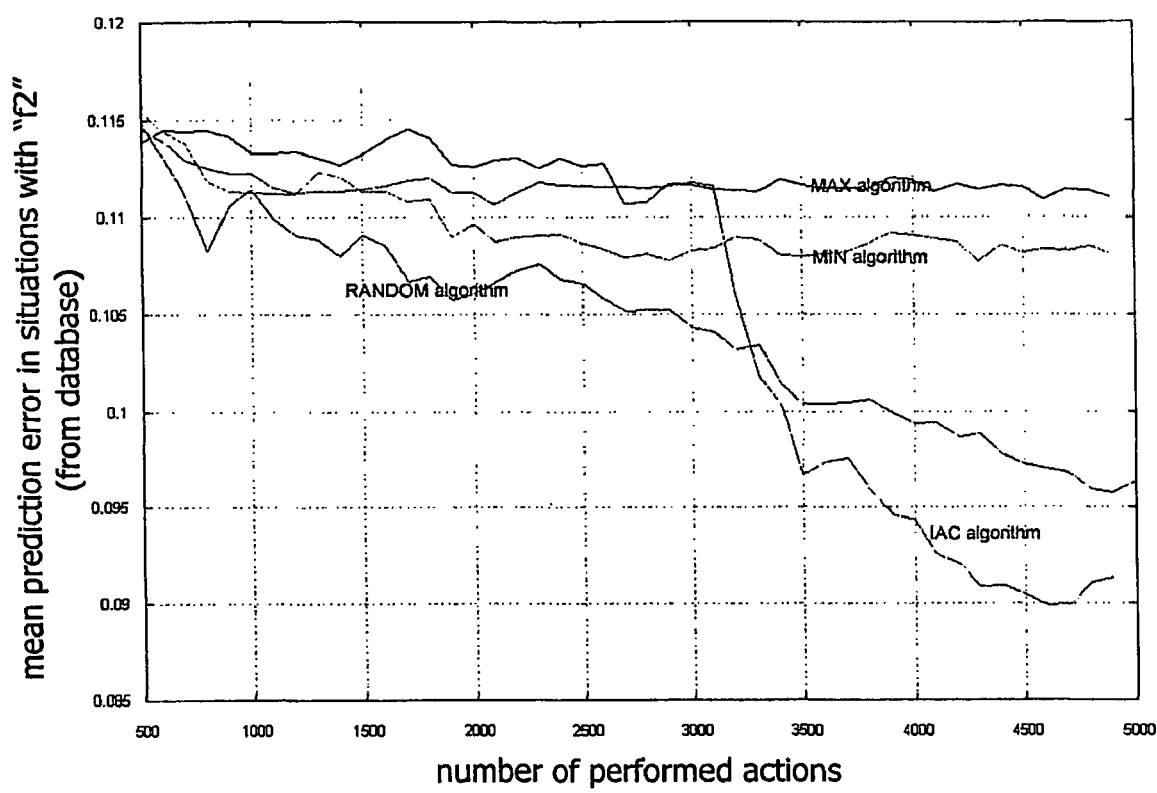

FIG. 16 is a graph indicating the percentage of time the simple robot of FIG. 8 spends in different situations when actions are selected according to the "minimizing" algorithm; and FIG. 17 is a graph comparing how learning progresses when the actions of the simple robot of FIG. 8 are selected using the action-selection algorithm according to the preferred embodiments of the present invention and using algorithms according to the comparative examples.

FIRST ASPECT OF THE INVENTION

Figure 4:
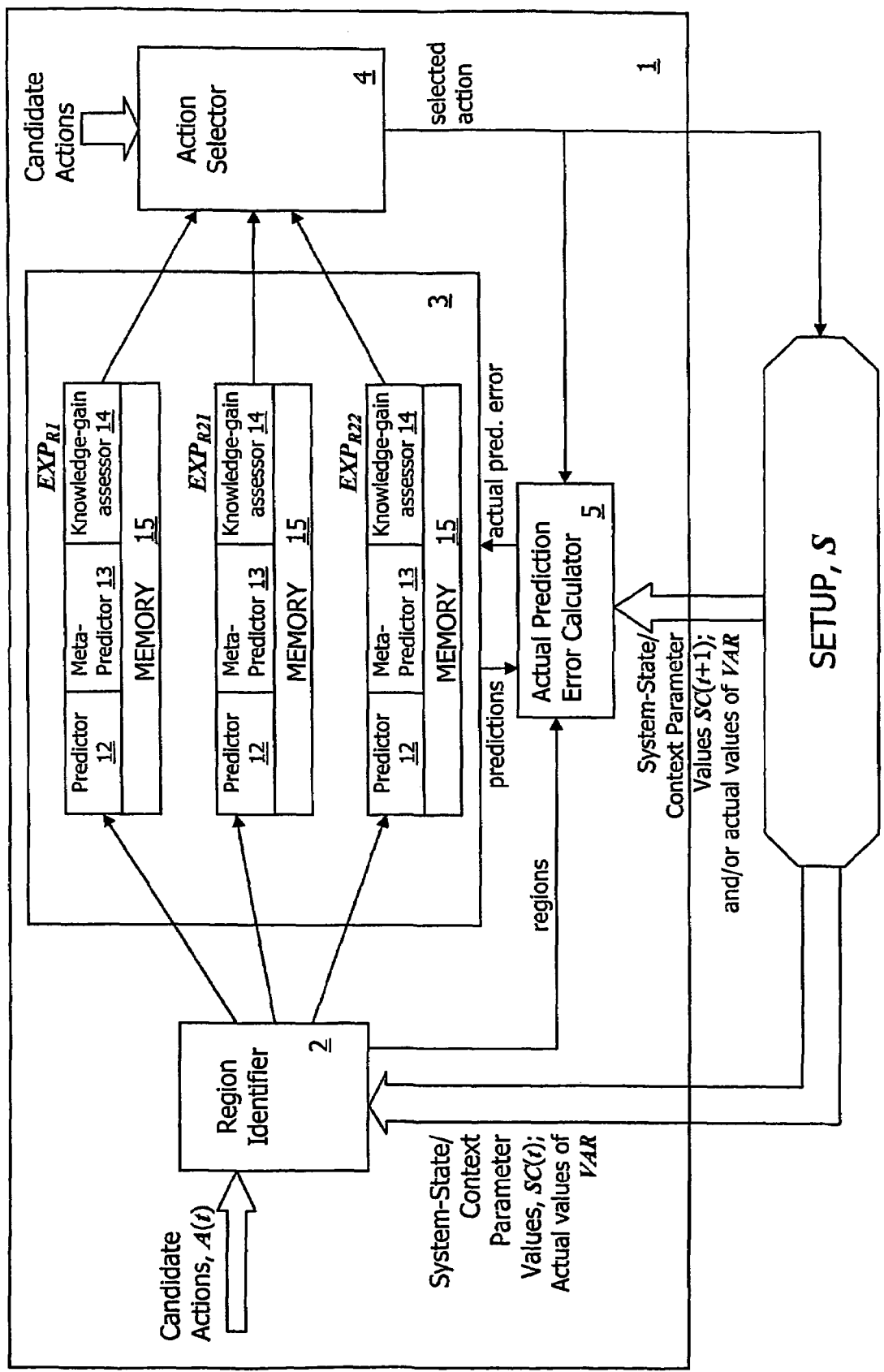
FIG. 4 is a block diagram indicating schematically the main components of a preferred embodiment of action-selection system according to a first aspect of the present invention.

FIG. 4 is a block diagram which illustrates schematically the main components of an action-selection system 1 according to a preferred embodiment of the first aspect of the present invention, which is used to investigate the behaviour of a setup or system S. It is to be understood that, in practice, this action-selection system will often be implemented in software; the different "modules" shown in FIG. 4 are identified merely to aid understanding of the various functions that are performed in the overall system. Moreover, the distribution of functions between the various modules shown in FIG. 4 could be changed and/or these functions could be performed using a lesser or greater number of modules than that shown in FIG. 4.

As shown in FIG. 4, the action-selection system 1 of the preferred embodiment of the first aspect of the invention includes a region-identifier module 2, a knowledge-gain assessment module 3, an action-selection module 4 and a module 5 for calculating actual prediction error. The action-selection system 1 selects which action should be performed at each of a series of time steps, these time steps being separated by a predetermined interval, τ.

The region-identifier module 2 receives signals SC(t) indicating what are the values of the system-state/context parameters of the setup or system S at a first time step t. This data can be obtained from the setup S in a number of different ways, as indicated above. In general, the values of the system-state/context parameters will either be input by a user or received directly from sensing devices coupled to the action-selection system 1.

The region-identifier module 2 also receives signals A(t) indicating what is the set of candidate actions that could be performed next. Typically, the $k^{th}$ candidate action, $A_k(t)$, assigns respective values $v_1, v_2, \ldots, v_n$ to each of a set of n action variables $AV_1, AV_2, \ldots, AV_n$. This can be expressed, as follows:

$$A_k(t) = \{AV_1(t) = v_1; AV_2(t) = v_2; \ldots; AV_n(t) = v_n\}.$$

It will be noted that each candidate action assigns values to the action variables for the current time step t. In fact, the action variables would not take the assigned values $v_1$ etc. until a time $t+\delta t$, because it takes the action-selection system 1 a finite time $\delta t$ to choose a candidate action and to arrange for this candidate action to be performed. However, this will not perturb the good functioning of the action-selection system 1 provided that the system-state/context parameters do not change significantly from SC(t) during the period t to $t+\delta t$. In many applications this will inevitably be the case because the system's state and context will not change until the selected action is performed. In other applications, notably real-time applications, the time $\delta t$ required to compute and select the action (typically a few milliseconds), and perform the action, is so short that the setup's state and context will not have changed during that brief time.

The set of candidate actions can be input to the action-selection system 1 of the present invention, for example by a human user or an external device or system. Alternatively, the action-selection system 1 may itself include a candidate action generator module (not shown). In either case, given the setup's current state and context, it may be impossible to assign certain values to the action variables. In order to avoid redundant processing, it is preferable for the set of candidate actions to be generated taking into account the current values of the system-state/context parameters, SC(t).

In certain preferred embodiments of the invention, the action variables and system-state/context parameters are normalized within the action-selection system 1 of the invention, so as to take values running from 0.0 to 1.0. This simplifies processing within the system 1. The actual inputs to and outputs from the system can be converted between the normalised values and the corresponding "real-world" value using well-known techniques. For example, the "real-world" range of a voltage variable, VV, could be from 0.0 volts to 15 volts, such that the assignment of a value to this voltage variable in the following terms—"set VV to 0.2"—means "set voltage variable, VV, to 3 volts".

The region-identifier module 2 has a dual role. Firstly, it serves to divide up system-state/context/action space into a number of regions, as will be explained in greater detail below. Secondly, for each candidate action, $A_k(t)$, the region-identifier module 2 identifies the region of system-state/context/action space that contains the combination of this candidate action $A_k(t)$ and the current values SC(t) of the system-state/context.

The action-selection unit 1 according to the invention is adapted to assess knowledge gain separately for the different regions of system-state/context/action space. This is achieved by arranging the knowledge-gain assessment module 3 to include a number of expert units, EXP, one for each region of system-state/context/action space, and by virtue of the fact that the region-identifier module 2 is capable of identifying which region of system-state/context/action space contains the combination of each candidate action A(t) and the current values SC(t) of the system-state/context parameters.

FIG. 4 shows three expert units, $EXP_{R1}$, $EXP_{R21}$ and $EXP_{R22}$, in the knowledge-gain assessment module 3. However, the actual number of expert units defined in the knowledge-gain assessment module 3 at a particular time varies in a dynamic manner as the region identifier 2 subdivides system-state/context/action space into new regions.

According to the preferred embodiment of the invention, each expert unit includes its own prediction module 12, meta prediction module 13, knowledge-gain assessment module 14 and data memory 15. When the region identifier 2 determines that the candidate action would put the setup S into a situation that is in a region $R_{21}$ of system-state/context/action space, the expert unit $EXP_{R_{21}}$ associated with region $R_{21}$ is used to predict the outcome of performing this candidate action, to assess the expected knowledge gain that will result, and to output expected-knowledge-gain signals to the action selection module 4.

The operation of an expert unit $EXP_{R_{21}}$ associated with a region $R_{21}$ of system-state/context/action space will now be considered in more detail. A counting variable q can be used to designate the successive occasions on which the setup S is in a situation corresponding to region $R_{21}$ of system-state/context/action space. These occasions may be spaced apart in time in an irregular fashion.

When the region identifier 2 identifies region $R_{21}$ as the region of system-state/context/action space that contains the situation corresponding to a given candidate action $A_k(t)$, taking into account the current values SC(t) of the system-state/context parameters, the expert unit $EXP_{R_{21}}$ associated with region $R_{21}$ is activated. For this candidate action $A_k(t)$, the prediction module 12 of expert unit $EXP_{R_{21}}$ predicts the value of each a set of one or more variables VAR at the next time step (t+1). The nature of these variables VAR depends upon the system being investigated by the action-selection system of the invention. Typically, the prediction module 12 could attempt to predict what would be the value of one or more system-state/context parameters, or some variable(s) derivable from those parameters.

The predictions made by the prediction module 12 of expert unit $EXP_{R_{21}}$ can be labelled $VAR_{R_{21}}(t+1)$, and they are based on the system's current system-state/context parameter values SC(t), as well as on the given candidate action $A_k(t)$. In other words, $P_{R_{21}}(A_k(t), SC(t)) = VAR_{R_{21}}(t+1)$. More generally, for a candidate action A(t) corresponding to a situation in region, R, of system-state/context/action space, the prediction can be expressed by the equation:

$$P_R(A(t), SC(t)) = VAR_R(t+1) \quad (1)$$

A large number of different prediction techniques are known, for example: the nearest neighbour algorithm, methods using multi-layer perceptron neural networks, radial basis function neural networks, support vector machines, Bayesian machines, etc. The present invention is not particularly limited with regard to which method is used to perform the prediction process. However, in preferred embodiments of the invention the prediction function applied by the prediction modules 12 of the expert units is the nearest neighbour algorithm.

Moreover, it is advantageous for the prediction implemented by the prediction module 12 of a given expert unit, for example $EXP_{R_{21}}$, to be tailored to the characteristics of its region of system-state/context/action space, e.g. $R_{21}$. More particularly, over time the expert unit $EXP_{R_{21}}$ will adaptively modify the prediction function applied by its prediction module unit 12 so as to improve the prediction accuracy. (This will be the case for all of the above-listed examples of prediction techniques). The appropriate adaptation is implemented when the expert unit receives training example data for training examples located within the region of system-state/context/action space for which it is responsible. As each training example is assigned only to one region, this adaptation will be specific to the region $R_{21}$. Thus, even if the prediction modules 12 of all of the expert units initially apply the same prediction function (and initial use of the same function is not obligatory), after a time these functions will be different.

Each expert unit, EXP, also includes a meta prediction module 13 which estimates what will be the prediction error for each prediction made by the prediction module 12 of the same expert unit. For example, considering the operation of an expert unit $EXP_R$, it should be explained that, for each candidate action A(t) corresponding to a situation in region R of system-state/context/action space, the meta prediction module 13 of this expert unit $EXP_R$ computes a value indicating the respective errors $Ep_R(t)$ expected to be associated with the predictions $VAR_R(t+1)$ made by the prediction module 12 of this same expert unit, $EXP_R$, as follows:

$$MP_R(A(t), SC(t)) = Ep_R(t) \quad (2)$$

Once again, various techniques (for example the nearest neighbour algorithm, methods using multi-layer perceptron neural networks, radial basis function neural networks, support vector machines, Bayesian machines, etc) are known for performing meta prediction and the present invention is not particularly limited with regard to which method is used to perform the meta prediction process. However, in preferred embodiments of the invention the meta prediction function applied by the meta prediction module 13 of expert unit $EXP_R$ is a simple function according to which it is assumed that the prediction error for the currently-considered candidate action will be the same as the last actual prediction error observed for a training example in the region R for which this expert unit $EXP_R$ is responsible.

Once again, the meta prediction function applied by the meta prediction module 13 of expert unit $EXP_R$ can be tailored to the characteristics of the region R, such that the meta prediction function evolves over time whereby to increase in accuracy. Thus, even if the meta prediction modules 13 of all of the expert units initially apply the same prediction function (and, once again, this is not obligatory), after a time these functions will usually be different.

Each expert unit, EXP, also includes a knowledge-gain assessment module 14 which examines the value of the prediction error that is expected to arise for a given candidate action, $A_k(t)$, corresponding to a situation in the region, R, covered by this expert unit. The knowledge-gain assessment module 14 compares the expected prediction error with actual prediction errors that have been observed on one or more earlier occasions when the setup S had a combination of system-state/context parameters and action variables located in this same region R. This actual prediction error data is stored in a memory 15 associated with this expert unit. The operation of a preferred embodiment of the knowledge-gain assessment module 14 will be described in more detail later on.

The knowledge-gain assessment module 14 outputs, to the action selector module 4, data indicating the knowledge gain (decrease in prediction error) expected to arise if this particular candidate action is performed, together with data indicating the candidate action for which this expected knowledge-gain has been assessed.

On a majority of occasions, the action-selection module 4 selects, as the next action to be performed on or in the setup, S, that candidate action which is expected to lead to the greatest knowledge gain (which, in this case, is the greatest expected decrease in prediction error).

For a given set of candidate actions, it is fairly likely that knowledge-gain assessment modules 14 of more than one expert unit will output expected knowledge-gain information to the action selection module 4. In a variant of the present embodiment, the knowledge-gain assessment module 3 may itself include a unit which calculates which candidate action is expected to lead to the greatest knowledge gain. In this variant, the knowledge-gain assessment module 3 outputs to the action selection module 4 an indication of which candidate action is expected to yield the greatest knowledge gain (learning progress).

The action selection module 4 outputs a signal indicating what the selected candidate action is. This signal causes the selected action to be performed (either automatically or with intervention, for example, by a human user). The action selection module 4 also indicates to a calculator 5 which candidate action was selected for performance. The calculator 5 also receives a signal indicating the region, R, of system-state/context/action space corresponding to the selected candidate action. This enables the calculator to retrieve the prediction $VAR_R(t+1)$ from the appropriate prediction module within the knowledge-gain assessment module 3.

After an action is selected by the action-selection module 4 and performed at time t (more precisely, time t+δt), the calculator 5 determines what is the actual value, $VAR_{Ract}(t+1)$, of the predicted parameter(s) at the time t+1. It may be that the respective values of the predicted variables in the set VAR can be calculated from the values of the system-state/context parameters. In such a case, the calculator 5 receives as inputs the values of the system-state/context parameters at the time t+1. Alternatively, it may be necessary or convenient to input to the calculator 5 the actual values of the predicted variables in the set VAR that are observed at time t+1 as the outcome of performing the selected candidate action.

Based on the inputs it receives, the calculator 5 calculates what is the actual prediction error, $E_{Ract}(t)$, that is, what is the difference between the set of predictions $VAR_R(t+1)$ made by the prediction module 12 for this candidate action and the actual outcome $VAR_{Ract}(t+1)$ that has been observed.

For each predicted variable in the set VAR, the actual prediction error, $e_{Ract}(t)$, can be determined, as follows:

$$e_{Ract}(t) = [\text{absolute value } \{VAR_R(t+1) - VAR_{Ract}(t+1)\}]^k \quad (3)$$

where k is an integer greater than or equal to 1 (typically, equal to 2). The overall prediction error $E_{Ract}(t)$ can be calculated by combining the actual prediction errors obtained for each predicted variable (for example, by summing $|VAR_R(t+1) - VAR_{Ract}(t+1)\}|^2$).

The calculator 5 supplies this overall actual prediction error data $E_{Ract}(t)$ to the memory 15 associated with expert unit $EXP_R$, so that it can be taken into account by this expert unit in later calculations.

Now it is helpful to replace the variable t by a corresponding value of the counting variable q (recalling that q is the variable counting the number of times the system has encountered a situation in region R of system-state/action/context space, in other words q counts the number of training examples observed in region R). If $q^t$ indicates the value of counting variable q at time t, then the actual prediction error observed at time t can be designated $E_{Ract}(q^t)$.

At time step t the system is likely to have already been in situations in region R of system-state/context/action space on a number of occasions. Thus, there will be a series of actual prediction error values, $E_{Ract}(1)$, $E_{Ract}(2)$, $E_{Ract}(3)$, ..., $E_{Ract}(q^t-1)$, stored in the memory 15 associated with expert unit $EXP_R$. It can be impractical to base calculations on the entire series of actual prediction error values observed for the region R, so it is preferred to consider only the N+1 last observed values for this region. Moreover, in order to reduce the effects of noise, the average is determined of the current value and the N previous values of actual prediction error, as follows:

$$Em_{Ract}(q^t) = \frac{1}{N+1} \left\{ \begin{array}{l} E_{Ract}(q^t) + E_{Ract}(q^t-1) + \\ E_{Ract}(q^t-2) + \ldots + E_{Ract}(q^t-N) \end{array} \right\} \quad (4)$$

It will be seen that the successive terms in the above equation, reading from right to left, correspond to successive occasions on which the system encountered situations in region R of system-state/context/action space. In general, these successive occasions will be spaced apart in time in an irregular manner.

Now, the knowledge-gain assessment module 14 of the expert unit $EXP_R$ can define knowledge-gain (or "learning progress") achieved at time t, on the $q^t$-th occasion that the system 1 encounters a state in region R, as follows:

$$LP_R(q^t) = Em_{Ract}(q^t) - Em_{Ract}(q^t - N) \quad (5)$$

Now, at the time when the knowledge-gain module 14 estimates the learning progress expected to be achieved because of performance of a given candidate action at time t, it does not yet know the actual prediction error that will result from performance of this action, so it cannot calculate the average value $Em_{Ract}(q^t)$. However, the knowledge-gain module 14 does have available to it the estimate $Ep_R(t)$ produced by the meta prediction module 13 of this same expert unit $EXP_R$. Accordingly, the knowledge-gain assessment module 14 uses this estimate $Ep_R(t)$ instead of $E_{Ract}(q^t)$ when calculating a value for $Em_{Ract}(q^t)$, and assesses expected learning progress by comparing the thus-calculated value of $Em_{Ract}(q^t)$ with $Em_{Ract}[(q^t-N)]$.

In the preferred embodiments of the first aspect of the present invention, the action selection module 4 is arranged so that on a majority of occasions it selects the candidate action for which the expected learning progress is the greatest. However, it is beneficial if, on some occasions, the action selection module 4 makes a random choice of the next action. This allows the action-selection system 1 to discover new regions in system-state/context/action space that are interesting from the point of view of yielding information as to the behaviour of the setup or system S.

In certain successful experiments (described below in relation to FIGS. 10, 11 and 17), the action selection module 4 was arranged so that there was a probability of 0.85 that it would select the candidate action expected to yield the greatest learning progress, and a probability of 0.15 that it would select a random action. The present invention is not particularly limited with regard to the value of this latter probability. As long as the probability of selecting an action at random is greater than zero, the system 1 will discover new interesting regions of system-state/context/action space. However, if the value of this probability is equal to 1, then the system 1 will just be selecting actions at random. So, in the preferred embodiments of the invention, the probability, p, that the action selection module 4 selects an action at random is $0 \leq p \leq 1$.

In some applications, the action selected by the action selector 4 will be automatically performed, under control of the action-selection system 1. In other cases, the action-selection system 1 may merely output signals indicating what are the desired values of the respective one or more action variables. In the latter case, the selected action is performed either by a human user or by another machine or system. The outcome of the action is fed back to the action-selection system 1, either in terms of the resulting values of the system-state/context parameters at some later time (e.g. t+1), or directly in terms of the actual values of the set of predicted variables VAR as observed at the later time (e.g. t+1). The action-selection system 1 associates this outcome data with data defining the performed action as well as with data defining the system description at the time when the action was performed. The resultant ensemble of data constitutes one training example.

As mentioned above, the training example data comprises:
the performed action (that is, the values of the set of action variables defining the selected action performed at time t);
the description of the setup/system S at time t (that is, the values of the set of system-state/context parameters at time t); and
the outcome of the performed action (that is, the actual values of the set of predicted variables VAR at a predetermined later time, e.g. time t+1).

Incidentally, it is not essential for the feedback to be received by the system 1 at the time step subsequent to performance of the action. A number of time steps may intervene.

The training example data is supplied to the region identifier 2, as will be explained in greater detail below.

So far nothing has been said with regard to the way in which system-state/context/action space is divided up into the various regions. It is advantageous if this division of system-state/context/action space is performed by the region-identifier module 2 itself, progressively refining regions into smaller and smaller areas as it learns more about the different situations that can present themselves. According to the preferred embodiment of the first aspect of the present invention, this can be achieved as follows:

The action-selection unit 1 is arranged to perform memory-based learning. In other words, the action-selection system 1 is adapted to "remember" (store data on) each of the training examples encountered since the system 1 was last initialised, that is to log training example data for each time step. This training example data is made available to the region identifier module 2, and is associated with the particular region of system-state/context/action state which contains the end-point of the vector defined by this training example's values of system-state/context parameters and action variables.

Initially the region identifier 2 has no information as to which situations are similar to each other; the whole of system-state/context/action space is considered to be a single region and there is a corresponding single expert unit in the knowledge-gain assessment module 3. As the action-selection system 1 operates it will build up a set of training examples corresponding to values (system-state/context parameter values, actual values of the predicted variables, etc.) encountered at each time step. The example data is allocated to the single existing expert unit which handles predictions for the single existing region of system-state/context/action space.

As data is gathered on more and more training examples, the region identifier 2 applies a criterion C1 in order to decide whether or not to spit the initial single region of system-state/context/action space into two or more new regions. If the initial region is split into new regions, the original expert unit is split into a plurality of expert units—one for each of the new regions—(or new expert units are created), and the training example data that has already been collected is re-allocated to the expert unit associated with the relevant new region (that is, the new region which contains the combination of system-state/context parameter values and action variable values applicable at the time of this training example).

According to preferred embodiments of the first aspect of the invention, the criterion C1 used for deciding whether or not to divide up a region is a simple judgement based on the number of examples encountered in the original region. Notably, when the number of training examples encountered for a given region of system-state/context/action space has exceeded a predetermined number, NS, a decision is taken to partition the initial region into a plurality of new regions (for example, two new regions). In the experiments discussed below with reference to FIGS. 10, 11 and 17, the predetermined number NS was 250.

At the time of splitting a region, a criterion C2 determines how the original region is split, that is, what positions should be chosen for the boundaries of the new regions. In preferred embodiments according to the first aspect of the invention, the following criterion C2 is used: when a region R is split into new regions (for example, two new regions $R_1$ and $R_2$) the location of the boundary is set so that the example data that had already been collected for region R is split in a balanced fashion between the new regions and with a minimal variance. That is, after the split each new region will have inherited a number of training examples which is similar to the number of training examples inherited by the other new regions, and the variance of the example data will be minimized. This variance can be minimized within each new region of system-state/context/action space, or within "outcome space" (that is, within a space defined by the actual observed values of the set of predicted variables, VAR), or within a higher-dimensional system-state/context/action/outcome space defined by the values of the sets of system-state/context parameters, action variables and predicted variables. This condition can be expressed, as follows:

$$\text{minimize } [\{\text{card}(R1) \times \text{variance}(R1)\} + \{\text{card}(R2) \times \text{variance}(R2)\}]$$

According to the preferred embodiments of the first aspect of the present invention, when a region of system-state/context/action space is split in this way, the process of determining the location of the boundaries consists in first deciding which dimension (which parameter or variable, or combination thereof) to cut and then deciding the location of the (or each) cut point. The boundaries can be defined in simple terms, e.g. the first new region will contain examples in which a variable $V_1$ takes a value 0 to 0.5, the second new region will contain examples in which variable $V_1$ takes a value 0.51 to 1.0. The region identifier 2 maintains a list of cut dimensions and cut values.

The above-described region-splitting process is recursively iterated. When the criterion C1 is met for any of the regions recognised by the region identifier 2, that region in its turn is split into new regions. After a while, a tree structure develops, with the initial region (and its expert unit) forming the root, the first level of division of the root region corresponds to a branch which in its turn may be divided into further branches, ending in regions (and expert units) which can be considered to represent "leaves" of the tree structure. This tree structure corresponds to a segmentation of the input space, with each expert unit being a specialist for its own part of the system-state/context/action space.

The action-selection unit 1 continues to operate and, at each time step, the region identifier 2 determines what "leaf" region contains the combination of a given candidate action and the current values of system-state/context parameters. This determination is performed by comparing the candidate action variable values and the current values of the system-state/context parameters with the cut data defining the various regions of the tree structure. The expert unit applicable for this leaf region then makes its predictions. When the expected-knowledge gain has been assessed for each of the candidate actions, one candidate action is selected for performance. When the actual result is available, data indicative of the actual values of the set of predicted variables (VAR) is stored, together with other data for this training example, in the memory of the applicable leaf expert unit.

When the action-selection system 1 is used to select a series of actions, after some time it will build up a decision-tree architecture which reflects substantially all of the relationships that exist between the system-state/context parameters and action variables of the system, S. There will be a levelling-off in the prediction errors observed when predictions are made by the various prediction modules 12 in the expert units. This evolution of the prediction error values can be used as a sign that the learning process has succeeded in acquiring the desired knowledge about the setup S. Accordingly, the series of actions can be stopped. The action-selection system of the invention can include a control module (not shown) adapted to monitor the evolution of the prediction error values in the different expert units whereby to trigger a halt in the operation of the action-selection system 1 when a stop criterion is satisfied (e.g. when the percentage change in actual prediction error from one training example to the next has fallen below a threshold value for every "leaf" region defined by the region identifier 2).

By using the action-selection mechanism described above, the preferred embodiment of the first aspect of the present invention avoids transition effects: that is, when switching from an unpredictable situation to a highly predictable situation the assessment of expected knowledge gain will be based upon the previous actions in the unpredictable situation not merely upon the previous actions in time.

Moreover, by progressively refining the definitions of the regions it recognises in system-state/context/action space, the action-selection unit of the preferred embodiments of the present invention ensures that the learning process will first master the easy parts of the mapping to be learned, then progressively move on to the more difficult parts of the mapping. Not all parts of system-state/context/action space will be explored in detail, only those parts which are determined to be interesting.

By combining region-identification based on a "decision tree" architecture with predictions based on the nearest neighbour algorithm the action-selection unit of the preferred embodiment of the invention is an extremely efficient learning approach. Learning is maximally fast and prediction is accurate. In particular, the prediction is extremely fast compared with plain nearest-neighbour prediction: for example, with one million examples and NS=250, a plain nearest neighbours algorithm would involve one million computations, whereas the technique of the preferred embodiment of the first aspect of the present invention would involve only 250 computations (i.e. it is 4000 times faster). Moreover the technique according to the preferred embodiment of the first aspect of the invention gives more accurate results than plain nearest-neighbour prediction because the region-splitting reduces the over-fitting which characterizes the nearest-neighbours prediction algorithm.

THE SECOND ASPECT OF THE INVENTION

When the action-selection system 1 of the first aspect of the present invention has been run so as to select a series of actions, and the prediction errors in the various prediction modules have all reached plateau values, it can be considered that the action-selection system 1 has become an expert on the system or setup S. More particularly, the prediction modules of the various expert units will tend to produce fairly accurate predictions of the effect of different candidate actions in different setup conditions (that is in for different values of the system-state/context parameters).

In these circumstances, the combination of the region identifier 2 and the prediction modules 12 in the knowledge-gain assessment module 3 can be considered to constitute a prediction machine that has been trained to make accurate predictions with regard to the behaviour of the setup S. More particularly, the combination of the region identifier 2 and the prediction modules 12 can predict the respective values of the set of one or more variables, VAR, for different combinations of values of the action variables and system-state/context parameters.

Thus, according to a second aspect thereof, the present invention provides a method of training a prediction machine by causing it to form part of an action-selection system according to the first aspect of the invention and causing that system to select a series of actions until prediction errors level off in the prediction modules. The second aspect of the invention also provides a prediction-machine training system implementing this method.

Figure 5:
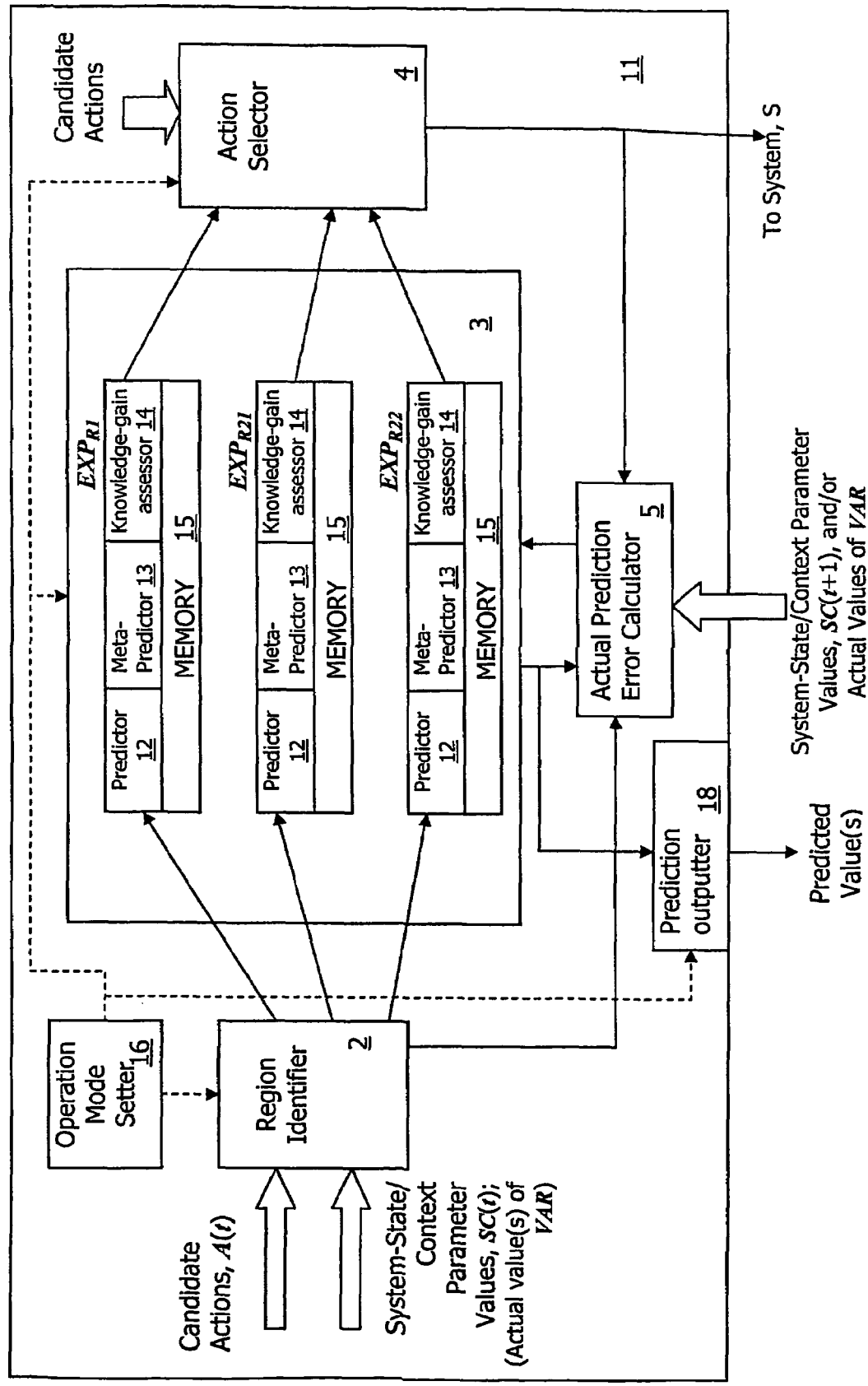
FIG. 5 is a block diagram indicating schematically the main components of a preferred embodiment of prediction-machine training system according to a second aspect of the present invention.

FIG. 5 shows, schematically, the main components of a preferred embodiment of prediction-machine training system 11 according to a preferred embodiment of this second aspect of the invention. It will be noted that this prediction-machine training system 11 has a similar construction and functioning to that of the action-selection system 1 that is illustrated schematically in FIG. 4. Accordingly, the same reference numerals are used in FIG. 5 to designate elements having a similar function to those in the action-selection system 1 of FIG. 4.

Once again, it is to be understood that this prediction-machine training system 11 would probably be implemented in software and the various "modules" shown in FIG. 5 are provided for illustrative purposes only. The various functions performed in the prediction-machine training system 11 may be split between modules in different ways from that shown in FIG. 5 and/or a greater or lesser number of modules can be used to perform these functions.

The prediction machine training system 11 shown in FIG. 5 includes a region identifier 2, knowledge-gain assessment module 3, action selector 4 and prediction error calculator 5 comparable to those used in the experiment-selection system 1 of FIG. 4. As indicated above, it is the combination of the region identifier 2 and the prediction modules 12 of the knowledge-gain assessment module 3 which constitutes the prediction machine to be trained by this training system 11.

The prediction machine training system 11 operates in two modes and has an operation mode setting module 16 which controls the different components of the system 11 dependent upon the mode in which the system is currently operating. In the first mode of operation the prediction machine is being trained and, in the second mode of operation, the prediction machine is already trained and is making predictions.

When the prediction-machine training system 11 is in the first operating mode, the region identifier 2, knowledge-gain assessment module 3 (and its expert units), action selector 4 and calculator 5 operate substantially as described above in relation to FIG. 4. In other words, a sequence of actions affecting a setup S is selected and performed, and training example data is accumulated regarding each performed action, the setup's description (state and context) at the time the action was performed and the outcome of the action. This training example data is used by the region identifier 2 to progressively build-up a decision-tree architecture based on dividing system-state/context/action space into finer and finer regions, corresponding to the different types of situation inherent in the setup S.

The training example data for each region is also used to adapt the prediction function applied by the prediction module 12 of the expert unit assigned to handle that region in the knowledge-gain assessment module 3. In other words, as the sequence of actions is selected and performed, the functions applied by the different prediction modules 12 in the knowledge-gain assessment module 3 become more and more closely adapted to the properties/behaviour of a respective region in system-state/context/action space that corresponds to a certain type of situation in the setup S.

The prediction modules 12 can be considered to be trained when the actual prediction errors made by the prediction modules 12 stop falling (that is, they reach plateau values). This can be detected by a module (not shown) that monitors the evolution of the actual prediction errors for each prediction module. When this situation is detected, the operation mode setter 16 switches over from the first operating mode to the second operating mode of the prediction-machine training system 11.

In the second mode, the operation mode setter 16 sends signals to the knowledge-gain assessment module 3 and action selector 4 so as to disable certain of their functions. More specifically, when the prediction-machine training system 11 is in the second mode of operation, the user inputs data identifying a possible action that could be performed, that is, specifying values for the set of action variables. The user also inputs data describing the setup's state and context, more particularly data specifying respective values for the set of one or more system-state/context parameters.

The region identifier 2 identifies which region of system-state/context/action space contains the end-point of the vector defined by this set of action variable and system-state/context parameter values, and activates the prediction module 12 of the expert unit which handles this region. The activated prediction module outputs its prediction of the values of the set of one or more predicted variables, VAR, to a prediction-outputting interface 18, which supplies them to the user.

In some applications, the user may use the trained prediction machine to make a prediction of the outcome of a particular action, perform that action, and feed back to the system 11 the outcome of the performed action. In such a case, the fed-back data can be used to generate a further training example which can be used to further adapt the prediction function applied by the appropriate prediction module.

EXAMPLES OF APPLICATIONS OF THE FIRST AND SECOND ASPECTS OF THE PRESENT INVENTION IN DIFFERENT FIELDS

The action-selection/prediction-machine-training technique of the present invention can be applied in a wide variety of fields. A few examples of applications in different fields will be outlined below. In each of the examples below it is assumed that an action-selection system (prediction-machine training system) as described above in relation to FIG. 4 (FIG. 5) is used.

Example 1

Biological Field

In this particular example, a human user wishes to find out how a certain organ of an organism reacts when injected with a mixture of chemicals. The mixture of chemicals can be defined by specifying the concentration of each chemical ($C_1$, $C_2$, $C_3$, . . . , $C_n$) and the reaction of the studied organ can be measured by determining what is the concentration ($CC_{30}$) of cells of a certain type in that organ thirty minutes after injection of the mixture of chemicals.

Each trial or action involves injection of chemicals into the organ and a consequent reaction which could entail damage to or destruction of that organ. Time and costs are also involved in performing each trial. Clearly it is desirable to be able to minimize the number of trials that are performed.

The user can ensure that knowledge regarding the reaction of the organism to chemical mixtures can be acquired in an efficient manner, thereby reducing the number of trials that are required, by making use of an action-selection system according to a preferred embodiment of the present invention, such as that shown in FIG. 4.

Preferably, the user employs a fully-automated assembly comprising the action-selection system of the present invention, together with a set of one or more automated robots which performs the selected actions and provides feedback to the action-selection system.

Figure 6:
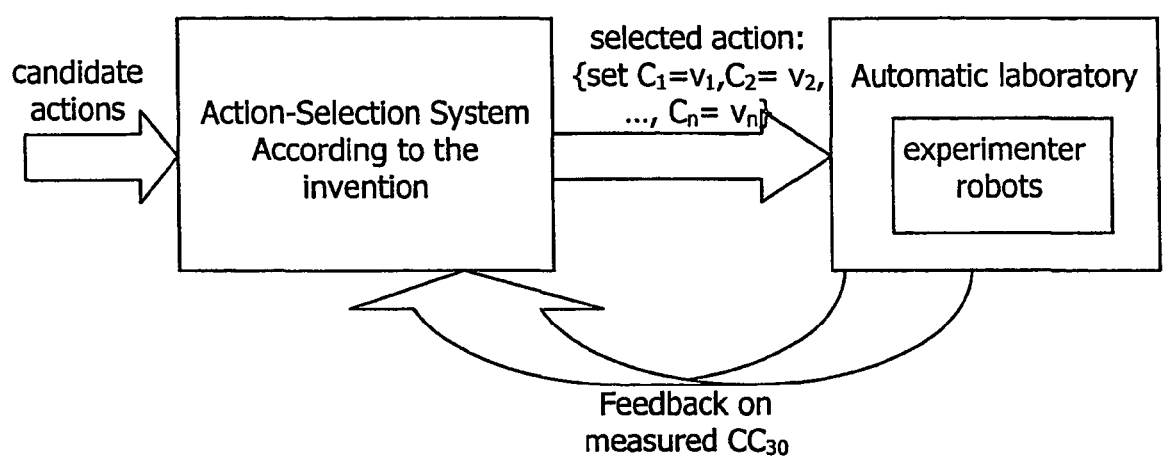
FIG. 6 is a schematic block diagram showing the main elements in one example of a fully-automated system applying the first (or second) aspect of the present invention in the field of biology.

An example of such a fully-automated system is shown, schematically, in FIG. 6. In the case illustrated in FIG. 6, an action-selection system according to the first aspect of the present invention (e.g. as shown in FIG. 4) is used to select between different candidate actions that are possible at a given time. The selected action is output to an automatic laboratory which includes a set of experimenter robots. The selected action is performed automatically and feedback on the outcome is fed from the automatic laboratory back to the action-selection system.

More particularly, in this example the action-selection system 1 may be configured to consider the concentration values $C_1$ to $C_n$ as action variables. In this example, the action-selection system will be configured such that its prediction module(s) seek to predict what $CC_{30}$ will be, that is what will be the concentration of cells of the specified type in the organ thirty minutes after injection of a particular mixture of chemicals.

In this particular example, there are no system-state/context parameters to be taken into consideration. Thus, in this case the region identifier 2 and the actual prediction error calculator 5 do not have system-state/context parameter inputs from the setup S under investigation, the only input they receive from the setup S is the actual value of $CC_{30}$ at a given time. However, if desired, the user could have configured the action-selection system 1 so that it recognises as system-state/context parameters (and monitors) the temperature, blood pressure etc. of the organism containing the organ under test.

The relevant prediction modules 12 of the action-selection system predict $CC_{30}$ for each of a number of candidate actions, that is, for each of a number of different possible combinations of values of the action variables C1, C2, . . . , Cn. In the fully-automated assembly, the different sets of candidate actions that are considered may be generated automatically within the action-selection system 1 itself, or by a separate candidate-action generation module, or by the human user.

The candidate action to be taken is chosen (on a majority of occasions) based on the result of an evaluation by the action selector 4 as to which candidate action is expected to yield the greatest increase in knowledge compared to the last occasion on which the system had a combination of values of $C_1$ to $C_n$ that was in the same region of system-state/context/action space as the combination specified in the candidate action. On a minority of occasions, a random action is selected. Output is given as to which mixture of chemicals has been selected. This output is supplied to the set of automated robots and these mix up the selected mixture of chemicals and inject it into the organ under investigation.

After thirty minutes, one of the automated robots measures the concentration ($CC_{30}$) of the specified cells in the organ. The automated robot supplies the measured concentration ($CC_{30}$) to the region identifier 2 and actual prediction error calculator 5 of the action-selection system 1 as feedback, enabling the system 1 to determine what was the actual error on the prediction made by the prediction module for this candidate action (this mixture of chemicals).

Initially the action-selection system 1 will recognise only a single region in system-state/context/action space. However, as more and more actions are performed, new expert units will be created and a decision-tree structure will develop subdividing the system-state/context/action space (which, in this case, reduces to "action space") into different regions. The structure of this decision tree will reflect the relationships that hold between the concentrations of the various chemicals injected into the organ and the reaction of the organ to those chemicals (to the extent that any such relationships exist).

When each relationship has been learned by a prediction module 12 of the action-selection system 1 according to the invention operating on the relevant region of system-state/context/action space, the prediction errors made by the respective prediction module 12 will level off at a plateau value. The action-selection system 1, or the user, can monitor the evolution of the prediction error values so as to determine when the prediction modules 12 have, in effect, learned all that they can. At this point the series of actions can be stopped.

At the end of the series of actions the action-selection system 1 of the invention has developed into a prediction machine that is trained to predict how the studied organ will react to different mixtures of chemicals. If the user is interested in knowing what will be the effect of administering a particular mixture of chemicals to the studied organ, he can simply input the appropriate combination of values of $C_1$ to $C_n$ to the action-selection system 1, as if it were the only candidate action, and then sample the output from the appropriate prediction module—this will be a prediction of the resultant $CC_{30}$.

As an alternative to using the fully-automated assembly described above, the user could make use only of the action-selection system 1 of the invention and himself mix-up and administer the selected combination of chemicals and provide feedback to the action-selection system. The human user may also generate the various sets of candidate actions to be evaluated by the action-selection system 1 (although this can be done within the action-selection system 1 itself or by a separate candidate-action generation module).

It will be seen that, in this example of an application in the field of biology, the first aspect of the invention has provided the user with a machine which selects the actions in a sequence which enable the user to learn the effect of injecting particular combinations of drugs into an organ. The first aspect of the invention also provides a fully-automated assembly in which the action-selection system 1 determines which actions should be performed and a set of one or more automated robots performs the selected actions and provides feedback on the outcomes.

Moreover, in this example of an application in the field of biology, if the action-selection system of the invention were to be replaced by a prediction-machine training system such as that shown in FIG. 5, the second aspect of the invention would provide the user with a prediction-machine training system which, in an interactive process, trains a prediction machine so that it can predict the effect of injecting particular combinations of compounds into an organ. As a result of this interactive process, the user is also provided with a prediction machine that is trained to make predictions of what will be the concentration of cells of a particular type in an organ 30 minutes after injection of different mixtures of compounds. This trained prediction machine could, for example, take the form of a computer system or an expert system.

Example 2

Agricultural Field

Next consider an example in which a biotechnology firm is designing a particular species of yeast intended for sale to farmers. Yeast can be cultivated under different conditions, for example, using a greater or lesser quantity of water, fertilising chemicals and pesticides. The quality and quantity of the adult yeast will vary depending on the settings of these parameters as well as based on the agricultural context (for example, the type of soil, amount of sun, etc.). Different farmers may have different priorities: one wishing to use few chemicals whilst still assuring sufficient yield, another wishing to maximise the yield of yeast even if large quantities of chemicals are required.

The biotechnology firm wishes to study the way in which the amounts of water, fertilising chemicals and pesticides used during cultivation of its yeast affect the final yield, in different agricultural contexts.

The quantity of water, fertilising chemicals and pesticide applied per week during cultivation of the yeast can be specified using parameters W, F and P, respectively, the soil quality can be specified using a number of parameters $SQ_1$, $SQ_2$, etc., and the yield can be specified using a parameter Y indicating the number of kilograms produced per hectare a given number of weeks after planting.

Each action or trial involves cultivating a crop of the biotechnology company's yeast using water, fertilising chemicals and pesticide. There are labour costs, costs of water/chemicals, and extended periods of time required for performing each trial. Thus, it is desirable for the biotechnology company to be able to minimize the number of trials that are performed.

In this example, the action-selection system according to a preferred embodiment of the invention, such as that of FIG. 4, may be configured to recognise the parameters W, F and P as action variables, and to input as system-state/context parameters the values $SQ_i$ defining the nature of the soil (e.g. in terms of its nitrogen content, clay content, etc.).

In this example, the action-selection system 1 will be configured such that its prediction module(s) 12 seek to predict what will be the yield Y of yeast at the end of a specified time period from planting.

The action-selection system 1 according to the preferred embodiment of the invention will predict Y for each of a number of candidate actions, that is, for each of a number of different possible combinations of applied quantities of water, fertilising chemicals and pesticides (different combinations of values of action variables W, F, P), taking into account the current values of the system-state/context parameters $SQ_i$.

Once again, on a majority of occasions the candidate action that is selected by the action selector 4 for performance will be the one that is expected to produce the greatest increase in knowledge compared to the last occasion on which there was a combination of values for W, F, P and $SQ_i$ that was in the same region of system-state/context/action space as the combination of current $SQ_i$ values with the W, F and P values specified in the candidate action. On a minority of occasions a random action will be selected. Output is given as to which combination of values of W, F, P has been selected.

The biotechnology company receives the output from the action-selection system 1 and may then cultivate a crop of yeast under the specified conditions. After the requisite time period, the yield Y is determined. The measured yield Y is input to the action-selection system 1 as feedback, enabling the system's calculator 5 to determine what was the actual error on the prediction made by the relevant prediction module 12 for this candidate action (this set of cultivation conditions), taking into account the values $SQ_i$ at the time of the prediction.

As in the first example, as the series of trials progresses the action-selection system 1 will develop expert units which sub-divide system-state/context/action space, developing a decision-tree structure which reflects the relationships inherent in the system.

At the end of the series of trials, the combination of the region identifier 2 and the prediction modules 12 of the various expert units of the action-selection system 1 has developed into a prediction machine that is trained to predict how the yield of the biotechnology company's yeast is affected by different cultivation conditions. This prediction machine can be used by the biotechnology company, or supplied to farmers along with the biotechnology company's yeast, so as to enable them to evaluate the yield likely to result from use of different combinations of cultivation conditions, given their soil conditions.

It will be seen that, in this example of an application in the field of agriculture, the first aspect of the invention has provided the biotechnology company with a machine which selects the actions in a sequence of actions which enables the company to learn the effect of different cultivation conditions on the yield of its new yeast.

Moreover, in this example of an application in the field of agriculture, the second aspect of the invention provides the biotechnology company with a prediction-machine training system which, in an interactive process, trains a prediction machine so that it can predict the effect of different cultivation conditions on the yield of yeast, taking into account different soil conditions. As a result of this interactive process, the biotechnology company/farmer is provided with a prediction machine (e.g. in the form of a computer system or expert system) that is trained to make predictions of the yield of yeast for different combinations of soil and cultivation conditions.

Example 3

Field of Industrial Production/Manufacturing

This example concerns the case of a company manufacturing combustion engines or motors. Different compositions of fuel can be used to power these motors. However, the precise choice of composition will affect the functioning of the motor: some compositions may be cheap but cause the motor to deteriorate, cutting short its lifespan; certain other compositions may extend the lifespan of the engine but at the cost of increased energy consumption. The effect of the fuel composition on the engine's performance/lifespan may be particularly critical in the case of large engines used in factories and the like. It is desirable to know how variation of the fuel composition affects variables such as the lifespan of the engine, the fuel consumption, etc.

Clearly, tests involving determination of factors such as an engine's lifespan for different compositions of fuel can be extremely costly. Once again, it is desirable to be able to reduce the number of tests that must be performed in order to learn the effect of different fuel compositions on the engine and its performance.

The action-selection technique of the present invention can be used in order to determine the sequence of actions which should be performed so as to learn efficiently about the effect of different fuel compositions on the engine's performance. More particularly, below there is described the case where the engine manufacturer uses an action-selection system 1 as shown in FIG. 4 to select actions in a sequence that will investigate the performance of his engine when supplied with different fuel compositions.

In this example, the percentage by weight of different components a, b, ... m, in the fuel composition can be specified using parameters $C_a, C_b, \ldots C_m$, respectively. The amount of fuel consumed by the engine per hour of operation can be specified using a parameter FC, the power output rating of the engine can be specified using a parameter P, and the lifetime of the engine can be specified using a parameter, LT.

In this example, the action-selection system 1 according to a preferred embodiment of the invention may be configured to recognise the parameters $C_a, C_b, \ldots C_m$ as action variables. In this example, the action-selection system 1 will be configured such that its prediction module(s) 12 seek to predict what will be the useful lifespan of the engine (LT), the engine's fuel consumption (FC) and the power rating of the engine (P). In other words, in this example the set of predicted variables VAR includes three variables. This is another example in which no system-state/context parameters are defined for the action-selection system 1.

The action-selection system 1 according to the preferred embodiment of the invention will predict LT, FC and P for each of a number of candidate actions, that is, for each of a number of different possible fuel compositions.

Once again, on a majority of occasions the candidate action that the action selector 4 selects for performance, based on the output from the relevant knowledge-gain assessment modules 14, will be the one that is expected to produce the greatest increase in knowledge compared to the last occasion on which the system had a combination of values of $C_a, C_b, \ldots,$ and $C_m$ that are in the same region of system-state/context/action space as the combination specified in the candidate action. On a minority of occasions, a random action will be selected. Output is given as to which combination of values of $C_a, C_b, \ldots C_m$ has been selected.

The engine-manufacturing company receives the output from the action-selection system 1, and may then operate an engine under the specified conditions and note the useful lifetime of the engine, the fuel consumption and the power output when so operated. The measured data LT, FC and P is input to the action-selection system as feedback (actual values of VAR), enabling the calculator 5 of the action-selection system 1 to determine what was the actual error on the prediction made by the relevant prediction module 12 for this candidate action (this fuel composition).

As in the above-described first and second examples, as the series of tests progresses the action-selection system 1 will create new expert units (with respective prediction modules) which sub-divide system-state/context/action space according to a tree-like structure which reflects the relationships that exist between the different components of the fuel composition, the power rating of the engine, the fuel consumption of the engine and the lifetime of the engine.

At the end of the series of tests, the combination of the region identifier 2 and the prediction modules 12 of the action-selection system 1 has developed into a prediction machine that is trained to predict how the lifetime of the engine, its fuel consumption and power output are affected by the composition of the fuel supplied to it. When selling an engine, the manufacturer can supply this trained prediction machine to the end-user, enabling that user to evaluate the engine's performance for different possible fuel compositions.

It will be seen that, in this example of an application in the field of industrial production, the first aspect of the invention has provided the engine manufacturer with a machine which selects the actions in a sequence which enables the company to learn the effect of different fuel compositions on the performance of its engine.

Moreover, in this example of an application in the field of industrial production, the second aspect of the invention provides the engine manufacturer with a prediction-machine training system which, in an interactive process, trains a prediction machine so that it can predict the effect of different fuel compositions on the engine's performance. As a result of this interactive process, the engine manufacturer/engine user is provided with a prediction machine (e.g. a computer system or expert system) that is trained to make predictions of the engine's fuel consumption, power output and lifetime when using different fuel compositions.

Example 4

Financial Field

Consider an example in which a person wishes to be able to predict what will be the value of a particular financial object (e.g. a building or other asset; shares, a warrant, an option or other financial instrument; etc.) thirty days after purchase.

The value of the financial object will be affected by prevailing economic conditions; these can be considered to be the system's context and can be described using context parameters such as the end-of-day level of the local stock market index (SMI), the current interest rate (IR), etc.

The value of the financial object will often also be affected by a number of parameters defining that object. This can be understood by considering an example such as a (call) share option. This share option gives its owner the right to buy a certain quantity of shares on a particular day at a particular price, known as the "strike price". (An option to sell shares would be known as a "put" option). The share option itself can be traded and so will have a price; this is affected by the time left until the date on which the option can be exercised as well as the difference between the strike price and the actual market price for the same shares. On any given day it is usually possible to buy different options on the same shares, notably options having different strike prices and different exercise dates. The actual share price at the time of purchase of the option, and the price of the share option, can be considered to define the "state" of this kind of financial object and could be described using respective state parameters CP (current price of shares on date of purchase of option) and OP (current price of option).

In order to find out how the value of a call share option 30 days after purchase varies with economic conditions and the "state" of the option itself, it would be necessary to buy a number of options having different strike prices and exercise dates, in circumstances where the economic conditions (including the underlying share price) vary. Clearly each such purchase involves costs and, potentially, financial loss. Thus, it is desirable to be able to discover the relationships inherent in this system in an efficient manner. Use of the action-selection system according to the present invention enables this to be achieved.

Preferably, the user employs a fully-automated arrangement in which the action-selection system of the invention is adapted to be able to access online financial databases, electronic marketplaces and/or electronic trading systems (e.g. by connecting itself to websites), so as to be able to gather for itself the current values of the system-state/context parameter values, to initiate share option purchases and to obtain feedback on the outcome of those purchases.

Figure 7:
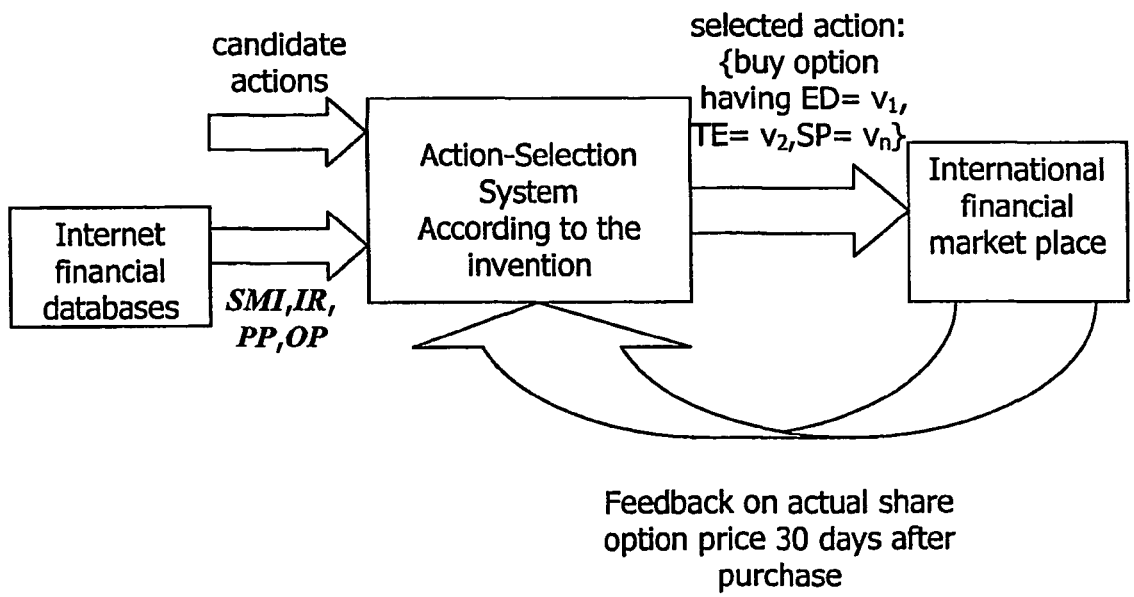
FIG. 7 is a schematic block diagram showing the main elements in one example of a fully-automated system applying the first (or second) aspect of the present invention in the field of finance.

An example of such a fully-automated system is shown, schematically, in FIG. 7. In the case illustrated in FIG. 7, an action-selection system according to the first aspect of the invention is capable of accessing Internet financial databases (for example the NASDAQ website) in order to obtain current values for various economic indicators and for parameters defining potential products that could be purchased. The action-selection system is also capable of making purchases in the international financial marketplace (e.g. by making use of an electronic trading system or online trading service) and of obtaining feedback from that marketplace, automatically, with regard to the outcome of those purchases.

In this particular example, the action-selection system 1 shown in FIG. 4 may be used in the fully-automated assembly of FIG. 7 and may be configured to recognise the end-of-day level of the local stock market index (SMI), the current interest rate (IR), the current share price (PP) and current option price (OP) as system-state/context parameters. The share option exercise date (ED) or time until exercise (TE), as well as the strike price (SP) are action variables.

The region identifier 2 and actual prediction error calculator 5 receive as inputs the values of the end-of-day level of the local stock market index (SMI), the current interest rate (IR), the current share price (PP) and current option price (OP) at a given time, t, when a purchase is going to be made. The prediction module(s) 12 of the action-selection system are configured to predict the value of the share option 30 days after purchase (based on the assumption that the values of the various system-state/context parameters that are input at time t will still hold when the actual purchase is made). The latter assumption is reasonable, given that the action-selection system 1 can select an action, and output data identifying that action, within a few milliseconds, and economic variables such as share prices vary much more slowly than that.

In this example the action-selection system 1 of the invention may be configured to process action variables ED and SP, corresponding to tuning of the exercise date and strike price parameters.

Once the action-selection system 1 has been configured, it accesses financial databases or the like so as to input details of the current values of the stock market index, SMI, the official central bank interest rate, IR, and the current share price, PP. The action-selection system 1 may itself include a candidate action generator so as to generate possible combinations of values for the exercise date and strike price, ED and SP. Alternatively, the different sets of candidate actions may be generated by a separate module or by the user. The action-selection system 1 accesses financial databases or the like in order to determine the prices, OP, of call share options having the combinations of exercise dates and strike prices specified in the candidate actions.

For each of these different potential call-share-option purchases, the action-selection system 1 of the invention seeks to predict what will be the value of the bought option in 30 days time, taking into account the input values for the economic indicators (SMI and IR), the current share price (PP), the current price of the option (OP), and the time until exercise of the option (TE) which the system can calculate for itself, provided that it knows the current date.

As an alternative to using a fully-automated arrangement, the user could make use of the action-selection system 1 only to select actions, and himself input the values of the various system-state/context parameters, make the selected purchases, and provide feedback as to the outcomes.

The action selector 4 of the action-selection system will select which action (purchase) should be tried next. In general, the selected action will be the one which is expected to produce the greatest increase in knowledge (assessed "locally" in system-state/context/action space), although random actions will be selected with probability p. The share option having the selected combination of strike price and exercise date can then be bought automatically for example via an electronic trading system (or by the user). The value of the purchased share option after 30 days is noted and fed back to the action-selection system automatically, from internet financial databases for example, or manually by the user.

Initially, the action-selection system 1 of the invention only recognises one region in context/system-state/action space and so all predictions are made a common prediction module. However, as the purchases suggested by the system are made, and feedback is received on the actual value of the purchased share options 30 days after purchase, the system will begin to divide up the space into different regions, creating new expert units (and corresponding new prediction modules 12) as required.

After a certain number of purchases have been made, provided that there is some non-random element in the system, the action-selection mechanism 1 of the invention will have developed expert units having prediction modules 12 that are tailored to the different situations that can arise (different combinations of economic indicators, share price, option parameters, etc.). The series of actions (purchases) can then be stopped and the user has available to him a machine which can predict what will be the value in thirty days time of share options defined by different combinations of strike price and exercise date, taking into account the current economic context and share price. He can compare these predicted values with the respective current prices of the share options in order to decide which purchases are more likely to provide financial gain.

The trained action-selection system 1 could be sold to third parties, as a trained option-value prediction machine. If the third party acts on the suggestions made to it by the trained prediction machine, he can feedback the results of his purchases (i.e. actual option value after 30 days) so as to provide the prediction machine with further examples to process. In other words, even after the prediction machine has been trained it is still possible to generate further "training examples" and refine the operation of the prediction machine yet further.

Incidentally, in this particular application it is not essential for the automated system (or the user) to actually make the selected purchases (perform the selected actions). The price of the selected share-option can be determined 30 days after it would have been purchased, and this price fed back to the action-selection system 1. It is true that the actual purchase of the share-option could have had an effect on the market value quoted for options having the same specification. However, unless an extremely large purchase was intended (or the market in shares of this type is extremely small) the absence of an actual purchase will no have a significant effect on the market value for this option in 30 days time.

It will be seen that, in this example of an application in the financial field, the first aspect of the invention provides a user with a machine which selects the actions in a sequence which enables the user to learn the effect of making different purchases in different conditions. The first aspect of the invention also provides a fully-automated arrangement in which the action-selection system 1 obtains for itself the system-state/context parameter values it requires (for example, by connecting itself to on-line financial databases), determines which actions should be performed, optionally performs them (by connecting itself to electronic trading systems), and obtains feedback on the outcomes (for example, by once again connecting itself to online financial databases). In this fully-automated arrangement the action-selection system 1 could be considered to comprise a software robot (or "softbot") making the required connections to websites/trading systems.

Moreover, in this example of an application in the financial field, the second aspect of the invention provides the user with a prediction-machine training system which, in an interactive process, trains a prediction machine so that it can predict the effect of making different purchase in different conditions. As a result of this interactive process, the user is provided with a prediction machine (e.g. in the form of a computer system or expert system) that is trained to make predictions of the future value of a particular financial instrument given different combinations of conditions at the time of purchase.

THE THIRD ASPECT OF THE INVENTION

According to the third aspect thereof, the present invention provides a technique and system for managing learning by, or organizing behaviour of, a self-developing device or system, as well as a self-developing device or system making use of such a technique.

Some types of self-developing devices are robotic devices, or other devices which have actuators and sensors enabling them to interact with their environment. According to the third aspect of the invention, it is possible to manage learning by such a self-developing device, and/or organize its behaviour, by treating that self-developing device interacting with its environment as a system S, and investigating its behaviour in a series of actions that are chosen in an autonomous fashion according to the action-selection technique of the first aspect of the invention. In general, the system-state/context parameters of such a system are the signals received by the self-developing device's sensors and the action variables will be the setting of the self-developing device's actuators. In this case, the system-state/context/action space equates to the self-developing device's sensory-motor state-space.

However, it is to be understood that the third aspect of the present invention is not limited to application with single self-developing devices which have sensors and actuators.

More particularly, the present invention is also applicable to systems which contain distinct separate components or entities working together, in which case the selected action may be the setting of respective values for action variables of one or more of the system components/entities.

Furthermore, the third aspect of the present invention is applicable to self-developing devices or systems which can be considered to be passive, that is, which do not have physical actuators and may not even have sensors. For example, the present invention can be applied to a self-developing computer system which receives or generates certain inputs, and produces outputs, thereby interacting with an environment. According to the third aspect of the invention, it is possible to manage the learning of such a self-developing system, or organize its behaviour, by treating that self-developing computer interacting with its environment as a setup or system S, and investigating the behaviour of this setup in a series of actions that are chosen in an autonomous fashion according to the action-selection technique of the first aspect of the invention. The system-state/context parameters in this case will generally be the inputs received or generated by the self-developing computer, and the set of action variables will be one or more variables whose value(s) are set based on one or more of the outputs from the self-developing computer.

For example, for a self-developing system constituted by a computer, the system-state/context parameters could include: data indicating the state of certain internal elements of the computer (e.g. status of flags, full/empty status of buffers, existence of a state of overflow, etc.), data input by a human operator, data indicating the state of a context or environment with which the computer system interacts, etc. This latter environment could be physical, for example in a case where the computer system controls a physical device or system, or it could be non-physical, for example in a case where the computer system is trying to teach itself what patterns there are in the data it is processing. In either case, management of learning by the computer system, or organization of its behaviour, can be achieved using the method according to the third aspect of the present invention.

Moreover, the third aspect of the present invention can be used to manage learning by, or organize the behaviour of, an expert system. For example, an expert system may be intended to interact with human users, by asking them a series of questions in order to make some determination (for example, as to the identity of the user). However, before using the expert system for that purpose, it may be useful for the expert system to perform a series of tests, in which it tries out different possible questions or sequences of questions in order to determine which sequence is most likely to enable it to make accurate determinations later on. Such a series of tests could be selected using a technique according to the third aspect of the invention, in order to organize the behaviour of the expert system/manage its learning during the test phase. In this example application, the action variables would be different possible questions that could be posed.

The third aspect of the invention will be described below with reference to a simple experimental set-up. As shown in FIG. 8, this experimental set-up involves a simple robot, RBT, moving in a square space that is enclosed by walls, WL. The robot is formed of a box mounted on a left wheel and a right wheel, and it can control the speed of each wheel separately. The robot also has two infrared sensors at the front, enabling it to sense the walls, a "toy sensor" to be discussed in greater detail below, and can produce sounds at a selected one of three frequencies (labelled f1, f2 or f3). It can be considered that the robot has two wall sensors (the two infrared sensors), one toy sensor, and three actuators (the controller of left wheel speed, the controller of right wheel speed, and the controller of sound frequency). The robot has an internal clock and updates the readings from its sensors, as well as the settings of its actuators, once every 1000 ms.

In the example discussed here, the robot has a decision-making unit integrated into it which determines which action the robot should take at a given time step. This decision-making unit comprises an action-selection system according to the first aspect of the invention, for example the action-selection system 1 of FIG. 4. In the present case, this action-selection system can be considered to be a module that manages the robot's learning process thereby obtaining a particular kind of organization of the robot's behaviour. It should be noted that the invention is not limited to the case where the action-selection system according to the first aspect of the invention (or the decision-making unit) is on-board the robot. This system and unit could be separate from the robot but in communication with it.

Furthermore, for simplicity it is assumed in the following discussion that the decision-making unit bases its decisions on which action the robot should take solely on the selections made by the action-selection system according to the first aspect of the invention—in other words, in this example there is only one drive motivating the robot's actions.

In the experimental set-up of FIG. 8 there is an intelligent toy, T, in the same space as the robot. The toy moves according to the sounds produced by the robot. In particular, when the robot emits sounds at frequency f1, the toy moves randomly around the space at a speed higher than the robot can move; consequently it seems to the robot as if the toy is appearing and disappearing at random positions. When the robot emits sounds at frequency f2, the toy stops moving. When the robot emits sounds at frequency f3, the toy jumps into the robot. The robot can detect the toy, here using a vision system, and calculate the toy's position relative to the robot, in terms of x and y co-ordinates. This vision-based system for detecting the toy and determining its position is designated the "toy sensor".

The above-described experimental set-up was simulated using the well-known "Webot" mobile robot simulation software provided by Cyberbotics Sari of Lausanne, Switzerland (available at www.cyberbotics.com).

At each time step, the robot (or, strictly speaking the action-selection system thereof) is arranged to decide what action to take: that is, what settings should be given to the speed of the left wheel, the speed of the right wheel, and the frequency of the sound the robot produces. Thus, in this case the action variables of the system are the left-wheel speed, right-wheel speed and sound frequency produced by the robot.

Simulations were performed in which the robot attempted to predict what would be the distance to the toy one time step (i.e. 1000 ms) after the robot took an action in a particular context (i.e. for a particular set of sensor readings). After elapsing of the 1000 ms period, the robot determined the actual position of the toy relative to the robot's own position in terms of (x,y) co-ordinates, using the toy sensor. Based on the sensed co-ordinate values, the robot calculated the actual distance to the toy.

When the robot produces the sound at frequency f1, the toy moves around randomly. In this case, it is impossible for the robot to determine a relationship which will accurately predict the distance between the robot and the toy. There is no correlation between the distance to the toy and the robot's sensor values and wheel speeds. Nothing worthwhile can be learned by exploring this situation. In other words, the robot will not learn efficiently if it spends a long time emitting sound at frequency f1.

When the robot produces the sound at frequency f3 the toy jumps inside the robot and so the distance between the robot and the toy is zero. It is fairly easy for the robot's action-selection system to learn this relationship between production of sound at frequency f3 and zero distance to the toy (even in the presence of noise, for example due to the sensors). This relationship has very low complexity.

When the robot produces the sound at frequency f2 the toy stops moving, but because of the robot's own movements it will still seem to the robot as if the toy is moving. Nevertheless, if the robot makes a series of observations while continuing to emit sound at frequency f2, its action-selection system should eventually learn that the distance to the toy is related to the robot's own movements.

The interval between selecting an action and observing its outcome was set at 1000 ms, which is a relatively long period of time. Accordingly there could be substantial changes in the toy's position relative to the robot. This made it more difficult for the robot's action-selection system to learn the above-mentioned relationships that exist between the motor speeds of the robot's wheels, the sound frequency produced by the robot and the distance to the toy.

More particularly, in this example the goal was for the robot's action-selection system to learn mappings to enable it to predict, accurately, at a time t what would be the distance to the toy in 1000 ms time (i.e. at t+1) IF the robot takes a particular action A(t) in the robot's current sensory-motor context SC(t). The values of the system-state/context parameters and action variables in this case are the set of values measured by the robot's sensors (wall sensors and toy sensors) at the time t, as well as the settings of the robot's actuators at the time t.

The only real complexity in the mapping that the robot's action-selection system must learn resides in that part of the mapping which relates to production of sound at frequency f2. When sound at frequency f2 is produced, the distance to the toy varies, as a function of the sensory context SC(t) and the actions that are performed A(t), in a complicated but learnable manner.

If the robot is to learn efficiently it should spend a lot of time exploring situations in which sound is produced at frequency f2 (where there is a lot to learn), a little time in situations where sound is produced at frequency f3 (where there is a small amount to learn), and practically no time in situations where sound is produced at frequency f1 (where there is nothing that can be learned). The third aspect of the present invention provides a technique which enables the robot to autonomously organize its own behaviour so as to focus attention appropriately on the situations which will render its learning efficient.

Figure 9:
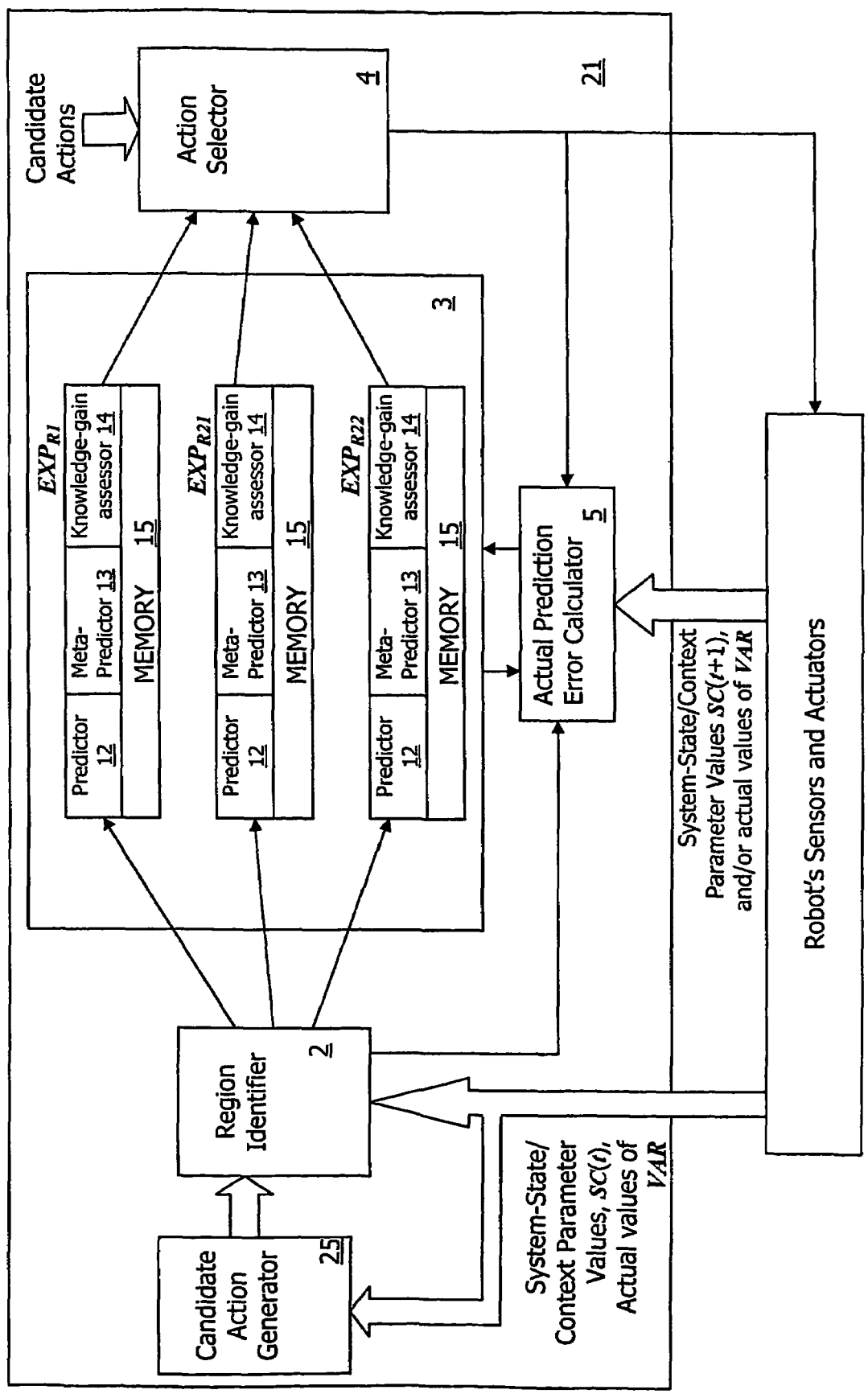
FIG. 9 is a block diagram indicating schematically the main components of a preferred embodiment of training system according to a third aspect of the present invention, for a self-developing device or system.

FIG. 9 shows, schematically, the main components of a preferred embodiment of action-selection system 21 that can be used to manage learning by, and/or organization of the behaviour of, the robot of FIG. 8. It will be noted that this action-selection system 21 has a similar construction and functioning to that of the action-selection system 1 that is illustrated schematically in FIG. 4. Accordingly, the same reference numerals are used in FIG. 9 to designate elements having a similar function to those in the action-selection system 1 of FIG. 4.

Once again, it is to be understood that this action-selection system 21 would probably be implemented in software and the various "modules" shown in FIG. 9 are provided for illustrative purposes only. The various functions performed in the action-selection system 21 may be split between modules in different ways from that shown in FIG. 9.

The action-selection system 21 of FIG. 9 receives inputs from sensors and actuators, these inputs representing the robot's sensory-motor state. In the present example, the inputs will be from the robot's infrared wall sensors, from the toy sensor, and from the robot's actuators (signals indicating the values of right wheel speed, left wheel speed and sound frequency—these signals may be supplied from controllers controlling the wheels/sound generator, rather than from the wheels/sound generator themselves).

In the preferred embodiments according to the third aspect of the invention, the signals from each of the sensors and actuators are normalised so as to fall within an interval 0.0 to 1.0. In the case of the sound frequency produced by the robot, f1 is produced when the "frequency" variable is in the range 0 to 0.33, f2 is produced when the "frequency" variable is in the range 0.34 to 0.66, f3 is produced when the "frequency" variable is in the range 0.67 to 1.0.

The action-selection system 21 includes a candidate action generator 25 which generates a list of possible actions that the robot could perform next, given the current values of its system-state/context parameters SC(t).

For each candidate action, the prediction module 12 in the relevant expert unit of the knowledge-gain assessment module 3 makes a prediction, d(t+1), of the distance to the toy at the next time step (in 1000 ms time). For each prediction made by a prediction module 12, the meta prediction module 13 of the same expert unit produces an estimate, Ep(t+1), of what will be the error in the predicted distance to the toy. The knowledge-gain assessment module 14 of this same expert unit compares the expected prediction error for the candidate action with actual prediction error data that has been observed and stored in the memory 15 of this expert unit, and outputs to the candidate action selector 4 a signal indicating the knowledge gain expected to arise if this candidate action is performed.

The action selection module 4 receives the expected-knowledge-gain signals, selects which action should be performed next and outputs appropriate control signals to the robot's actuators. The action selection module 16 also indicates to the calculator 5 which candidate action has been selected.

The calculator 5 calculates what is the actual prediction error, $E_{Ract}(t+1)$, and stores this data in the memory 15 of the appropriate expert unit.

Experimental Results

A number of simulations were performed to demonstrate the efficiency of the technique of the third aspect of the present invention for managing learning in a self-developing device. These simulations used the experimental set-up of FIG. 8 and ran for a large number of time steps. In these simulations the robot's action-selection system had no prior "knowledge", in particular it was not programmed to know that there is a difference between setting the speed of the wheels and setting the sound frequency—these parameters were, in effect, variables of unidentified type as far as the robot was concerned. The robot's action-selection system was designed to treat as an action variable any variable that it could tune, and to treat as a system-state/context parameter any parameter for which it could determine a value.

Figure 10:
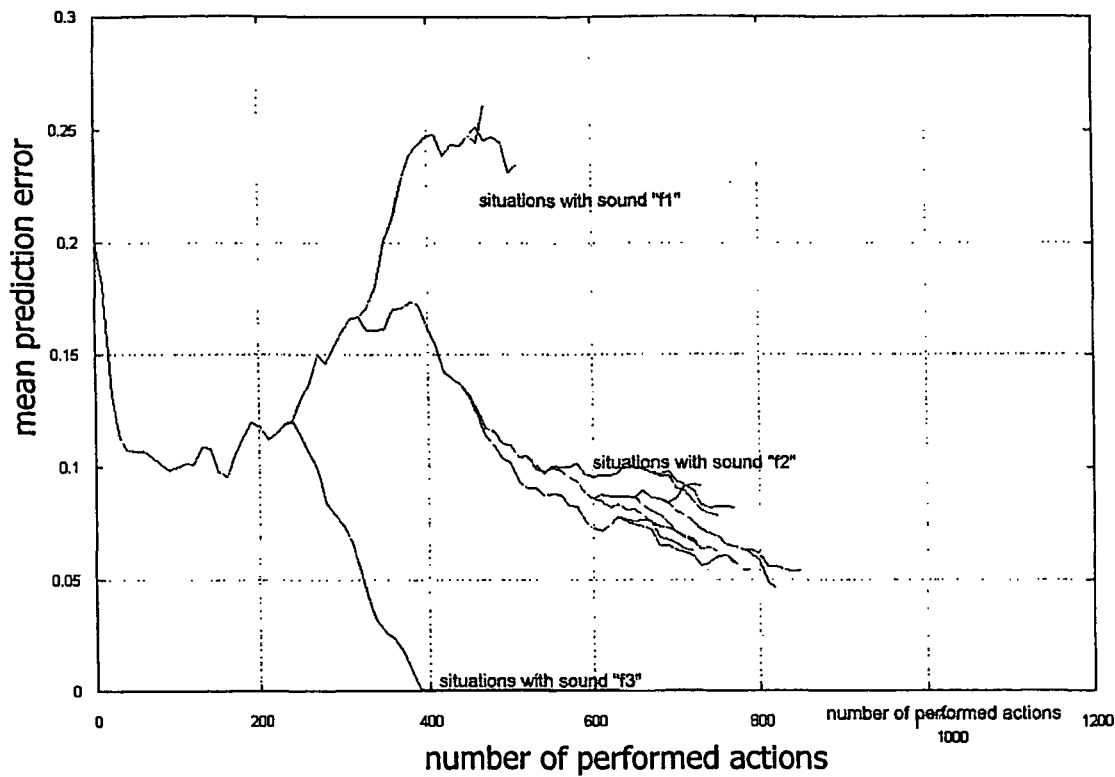
FIG. 10 is a graph showing how prediction error evolves when actions are selected according to a preferred embodiment of the action-selection method of the present invention, by the simple robot in the experimental set-up of FIG. 8.

FIG. 10 is a graph indicating how actual prediction error varied over time (as the number of performed actions increased) when the action-selection system 21 of the preferred embodiment of the invention was used to help the robot of FIG. 8 to learn to predict the distance to the toy T. In this simulation, the action selection module 4 had a 0.85 probability of selecting the candidate action expected to produce the greatest knowledge gain and a 0.15 probability of selecting a random action.

In FIG. 10, a separate line is drawn to represent the evolution of actual prediction error for each "leaf" expert unit. On splitting of an expert unit, each of the new "leaf" expert units inherits from the initial expert unit those training examples (and actual prediction error values) which relate to the sub-region of system-state/context/action space now assigned to this new "leaf" expert. Thus, the prediction error traces in FIG. 10 overlap at the left-hand side of the graph and progressively split from each other at the times when the corresponding expert units split. Thus, a tree structure appears in FIG. 10 and this corresponds to the decision-tree structure developed by the region identifier 2.

It will be seen that three groups of expert units developed during the simulation. Tests confirmed that the different branches of the decision-tree structure did indeed correspond to different situations; the topmost branch in FIG. 10 corresponds to situations in which the robot produces sounds at f1, the middle branch corresponds to situations in which the robot produces sounds at f2, and the lowest branch corresponds to situations in which the robot produces sounds at f3.

As shown in FIG. 10, the decision-tree structure quickly developed so as to distinguish those situations in which sound was being produced at f3. After only 250 time steps the robot (or, rather, its action-selection system 21) was able to differentiate situations in which sound was being produced at f3 from situations where sounds were being produced at other frequencies. At this time, the initial (or "root") expert unit in the action-selection system 21 was split into a first "branch" expert unit handling situations where the "sound frequency" variable took values 0.67 to 1.0 (i.e. sounds at f3) and a second "branch" expert unit handling situations where the sound frequency variable took values 0.0 to 0.66 (i.e. sounds produced at f1 or f2).

The robot discovered that, initially, the situations with sounds at f3 were the most important sources of learning progress. Thus, the majority of the time actions were selected which kept the robot in situations where the robot produced sounds at frequency f3. However, the robot very quickly learned all there is to know about such situations, namely that the distance to the toy is substantially zero in these cases. Accordingly, the prediction error quickly fell to around zero and these situations were no longer a source of learning progress.

During the initial stage of the simulation, although the robot preferred to explore situations with sound at f3 (because these offered the greatest learning progress) it nevertheless performed some actions which involved production of sounds at f1 or f2 because of the random selection of actions by the action-selection module 4. After a time, the "branch" expert unit handling situations where the sound frequency variable took values 0.0 to 0.66 (i.e. sounds produced at f1 or f2) had accumulated sufficient examples to meet above-mentioned criterion C1. This occurred at around the $320^{th}$ time step, at which time this branch expert unit split into an "upper branch" expert unit handling situations where the sound frequency variable took values 0.0 to 0.33 (i.e. sounds produced at f1) and a "central branch" expert unit handling situations where the sound frequency variable took values 0.34 to 0.66 (i.e. sounds produced at f2).

At about the $400^{th}$ time step the robot (or, strictly speaking, the knowledge-gain assessment modules of the expert units in the action-selection system 21) accurately determined that situations with sounds at f2 would provide greater learning progress than situations with sounds produced at f3 or situations with sounds produced at f1. Accordingly the action-selection module 4 tended to select actions which would involve production of sounds at f2.

Because the action-selection module 4 occasionally chooses random actions, the robot sometimes performs actions involving production of sounds at f1. However, when sounds are produced at f3 the expert units cannot learn anything to help them improve the accuracy of their predictions of the distance to the toy. Accordingly, the expert units quickly learn that actions resulting in the production of sound at f3 can produce no knowledge gain. It will be seen in FIG. 10 that the branch corresponding to situations with sounds at f1 ceases to be explored.

On the other hand, as more and more training examples are accumulated for situations in which sounds are produced at f2, the expert units can begin to see relationships between the robot's actions and the distance to the toy, thus enabling their predictions to improve. Accordingly, the robot explores different situations in which sound is produced at f2, experimenting with varying the speed of its left and right wheels. It has been found that, when using the active-learning management algorithm of the preferred embodiment of the present invention, this exploration of motor speed settings is organized and the speed settings are themselves selected in a manner which optimizes learning progress.

Figure 11:
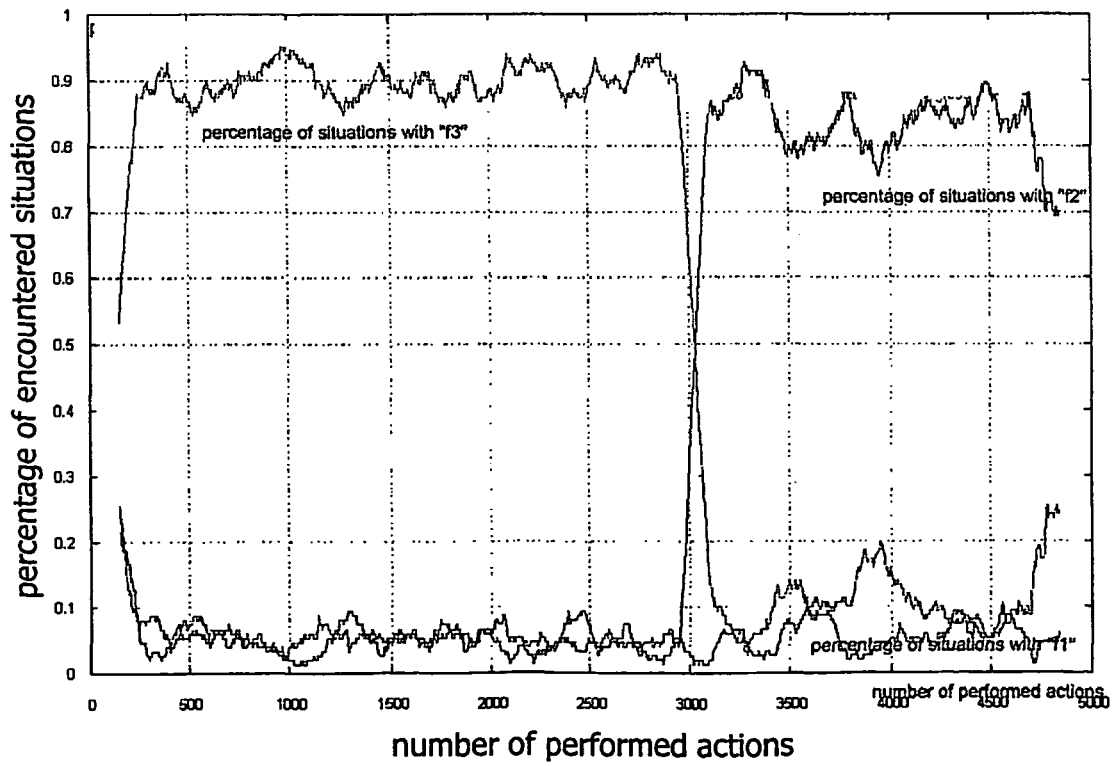
FIG. 11 is a graph indicating the percentage of time the simple robot of FIG. 8 spends in different situations when its actions are selected according to the preferred embodiment of the action-selection method of the present invention.

For the above-described simulation, it is interesting to consider how much time the robot spends in situations where sounds are produced at f1, f2 and f3, respectively. In order to investigate this, the simulation was repeated and FIG. 11 indicates how the percentage of time the robot spent in performing actions of different kinds varied as time went on (after the robot had performed a greater and greater number of actions). In FIG. 11, separate traces represent the percentage of time spent performing actions in which sound is produced at f1, f2 and f3, respectively.

FIG. 11 shows that the robot initially concentrates its attention on situations in which sounds are produced at f3. After the robot has mastered these situations it turns its attention to situations in which sounds are produced at f2.

From a consideration of the results of these simulations it will be seen that, by managing the robot's learning using the preferred embodiment of the third aspect of the invention, the robot has been able, autonomously, to scale the complexity of the situations it investigates, starting with situations of relatively low complexity and moving on to those of greater complexity. It has also been able to avoid spending time exploring situations where there is nothing to be learned. Thus, the third aspect of the present invention enables the robot to engage in efficient learning. Moreover, use of this technique also enables the robot to organize its own behaviour without outside intervention. This is a highly-desirable achievement.

As mentioned above, the active-learning management technique of the third aspect of the invention can be termed an Intelligent Adaptive Curiosity drive.

Comparative Examples

FIGS. 12 to 17 are graphs representing the results of simulations that were performed for the purposes of comparing the intelligent adaptive curiosity drive of the third aspect of the present invention with other known techniques for managing active learning.

First Comparative Example

Figure 12:
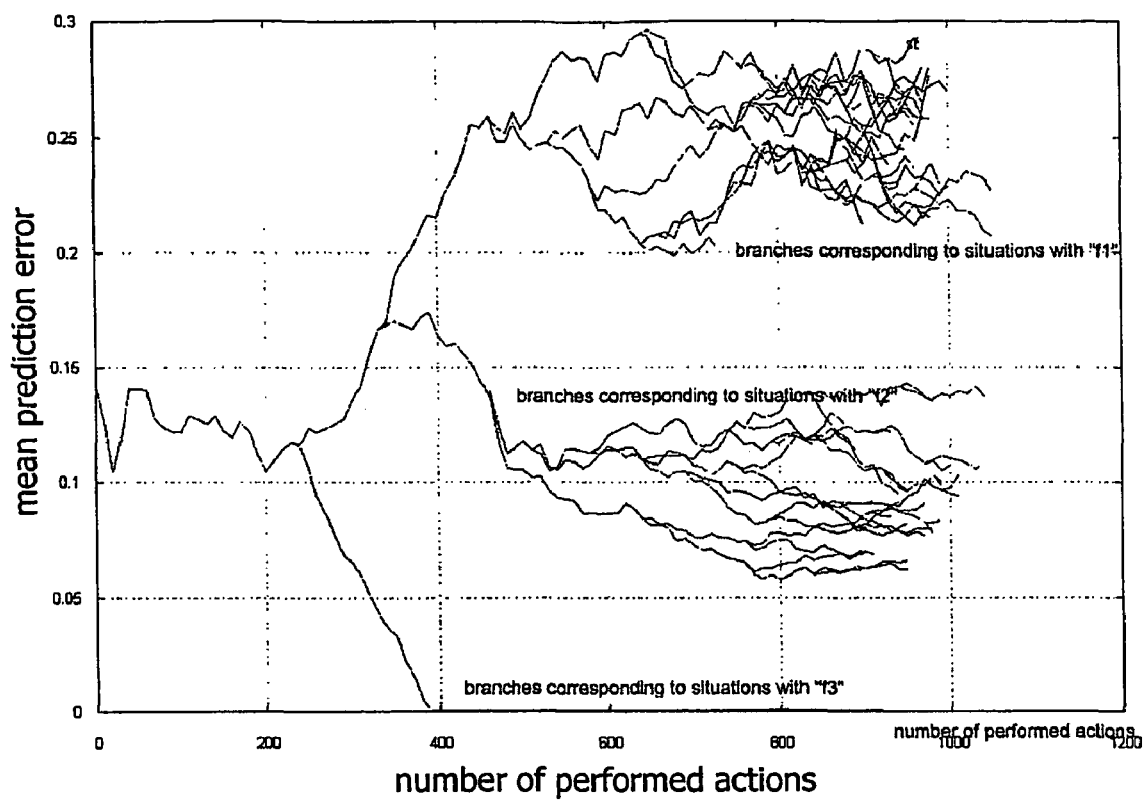
FIG. 12 is a graph showing how prediction error evolves when, according to a first comparative example, actions are selected in a random manner by the simple robot in the experimental set-up of FIG. 8.

FIG. 12 shows how prediction error evolved over time in a simulation comparable to that describe above, in which the robot used expert units handling different regions of sensory-motor state-space and progressively divided up that space into regions according to the same criteria C1 and C2. However, in the case of this first comparative example, there was no assessment of expected knowledge gain; instead, actions were selected entirely at random. The algorithm used in this first comparative example can be denoted the "random" algorithm (RAN).

FIG. 12 shows a typical example of results obtained for the RAN algorithm after 15000 random actions. Sensory-motor state-space has been divided into three main regions, respectively corresponding to situations in which sounds are produced at f1, f2 and f3. Early on, situations have been explored in which sounds are produced at f3 and the system has learned how to predict the distance to the toy in those situations. Moreover, over time the prediction error associated with situations in which sound is produced at f2 has decreased. However, the system continues to perform actions which involve the robot producing sounds at f3. It is completely unproductive to do so, because the robot can learn nothing in these situations. Thus, in contrast to the intelligent adaptive curiosity drive of the present invention, the RAN algorithm does not produce efficient learning.

Second Comparative Example

Figure 13:
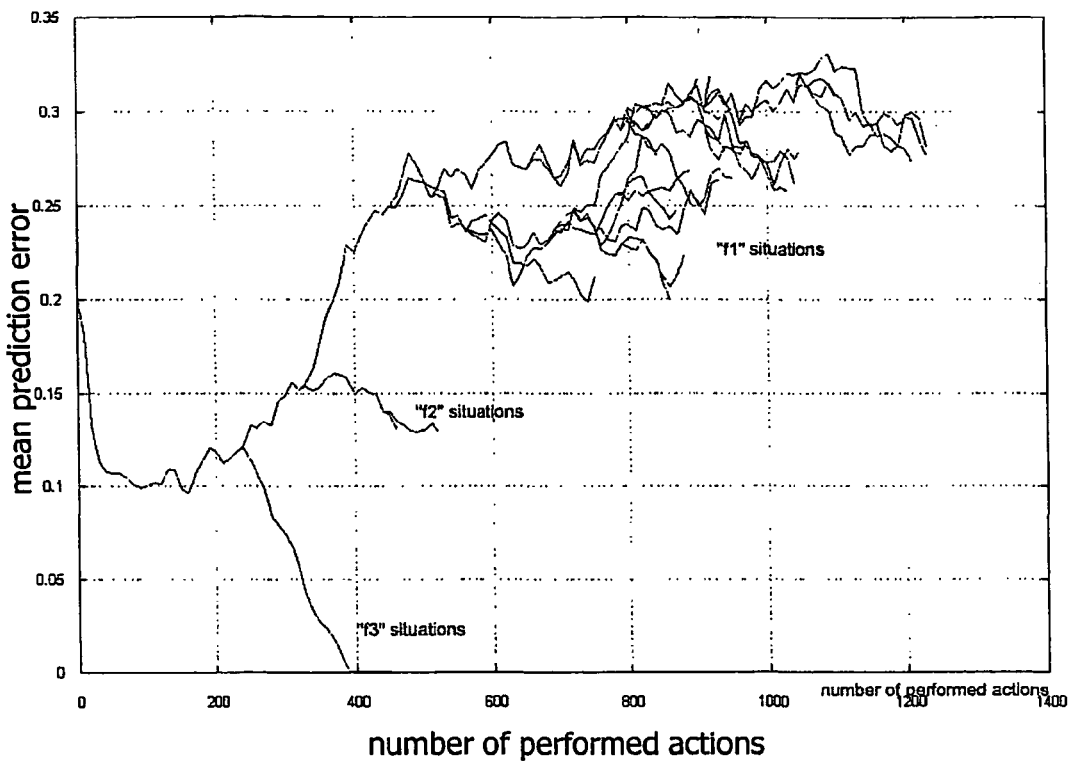
FIG. 13 is a graph showing how prediction error evolves when, according to a second comparative example, actions are selected according to a "maximizing" algorithm by the simple robot in the experimental set-up of FIG. 8.
Figure 14:
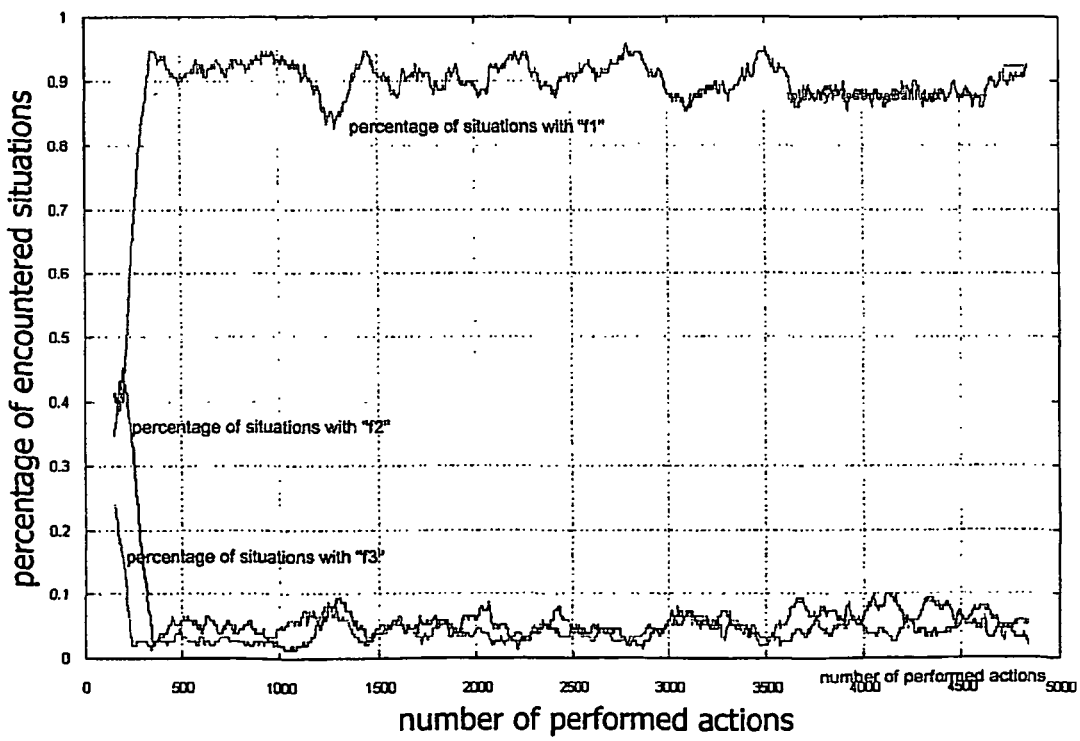
FIG. 14 is a graph indicating the percentage of time the simple robot of FIG. 8 spends in different situations when actions are selected according to the "maximizing" algorithm.

FIG. 13 shows how prediction error evolved over time in another simulation comparable to the first described above. Once again the robot used expert units handling different regions of sensory-motor state-space and progressively divided up that space into regions according to the criteria C1 and C2. However, in the case of this second comparative example, actions were selected according to a conventional approach that can be summarized "choose the action which you expect to maximize prediction error". This can be termed the "maximizing" algorithm (MAX). It will be seen that this algorithm seeks out novel situations (on the assumption that these situations offer the greatest potential for learning).

FIG. 13 shows a typical example of results obtained using the MAX algorithm. Once again, sensory-motor state-space has been divided into three main regions corresponding to situations with sounds produced at f1, f2 and f3, respectively and, at an early stage, the system learns how to predict the distance to the toy in situations where sounds are produced at f3. However, situations in which sounds are produced at f2 and f3 are not explored in detail; instead, the system concentrates on situations where sounds are produced at f1. This made even clearer by considering FIG. 14, which shows the percentage of time the robot spent in the three different types of situations. After only 1000 time steps, the robot is already spending 35% of its time in situations in which sounds are produced at f1.

It can be seen that, when seeking to manage active development, the MAX algorithm is counter-productive: it leads the robot to explore situations in which nothing can be learned.

Third Comparative Example

Figure 15:
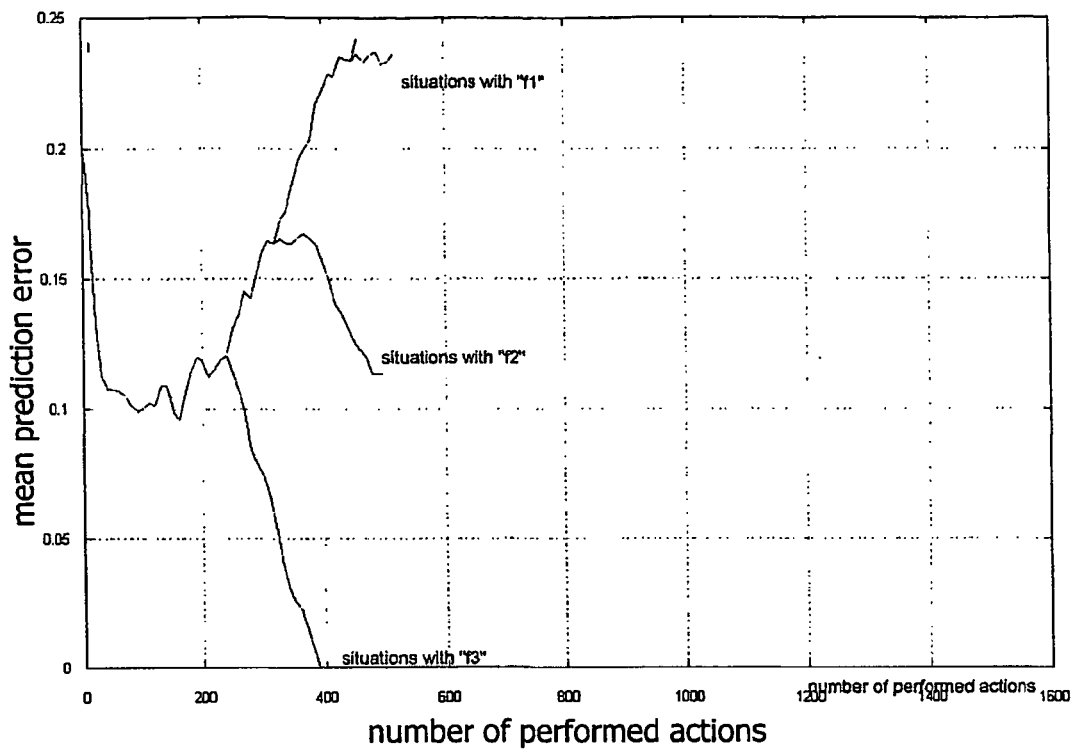
FIG. 15 is a graph showing how prediction error evolves when, according to a third comparative example, actions are selected according to a "minimizing" algorithm by the simple robot in the experimental set-up of FIG. 8.

FIG. 15 shows how prediction error evolved over time in a fourth simulation. This third comparative example was similar to the second comparative example except that actions were selected according to a conventional approach that can be summarized "choose the action which you expect to minimize prediction error" (a "minimizing" algorithm (MIN)).

In fact, FIGS. 15 and 16 are the same sort of graphs as FIGS. 10 and 11 but, this time, plotted for a simulation using the MIN algorithm. In this case the algorithm drives the robot to stay in situations in which sound is produced at f3, the most easily learnable and predictable situations. This is not as inefficient as the MAX algorithm, but it is still counter-productive, very quickly the robot will have learnt all there is to know about the simple situations but it will not progress to explore more complex situations.

Advantages Of The Third Aspect Of The Invention

The action-selection technique according to the third aspect of the present invention allows a robot (or other self-developing device or system) to scale the complexity of its learning situations by successively and actively focusing its activity on problems of progressively increasing difficulty. This is achieved through the efficient and operational discovery, within system-state/context/action space, of regions of varying complexity, then evaluation of the relative complexity of these regions (in terms of learning potential), and the exploitation of this information by the robot (or other self-developing device or system) to self-organize its behaviour.

Other techniques for managing learning do not lead to development of this kind of organized behaviour except, perhaps, in very particular kinds of environment: for example, in an environment in which perturbations of increasing complexity are continuously generated. Such environments can be produced by human intervention but, otherwise, they are believed to be extremely rare. By way of contrast, as long as there is some potential complexity in the robot/environment, the third aspect of the present invention can efficiently manage open-ended learning without complicated dynamics of this kind.

The efficiency of the active learning achievable using the third aspect of the present invention is greater than that obtained using the algorithms of the comparative examples. This was shown by a further set of simulations which involved computing, at different stages in the simulation, how much the robot has learned about the more interesting situations, that is, the situations in which sounds are produced at f2.

In this set of simulations, the robot used the active-learning management technique of the preferred embodiment of the invention, the RAN, MIN and MAX algorithms, respectively, to predict the distance to the toy at each of a large number of time steps. After every 150 time steps, each simulation was temporarily stopped and the robot was exposed to a test database to see how well the robot could predict the distance to the toy for a number of situations in which sounds were being produced at f2. When each simulation was restarted, the examples in the test database were not maintained in memory (so as to avoid biasing the test results).

Incidentally, the test database was generated as follows. The robot was operated such that it selected actions at random. For each situation in which sounds were produced at f2, a note was made of the robot's sensory-motor data at that time as well as the distance to the toy.

FIG. 17 shows the results of this set of simulations, more especially it shows, for each of the different algorithms, how the mean prediction errors produced on analysing the test database varied over time.

It will be seen from FIG. 17 that, initially, the RAN algorithm gives the lowest prediction error. In other words, early on it is the random algorithm that lets the robot learn the most about the situations where sounds are produced at f2. However, after about 3000 actions (time steps), the active-learning management technique according to the third aspect of the present invention begins to produce markedly lower prediction errors for these situations with sound at f2. This corresponds to the fact that the robot has turned its attention away from situations having sound at f3 (which the robot has thoroughly explored) and towards the situations with sounds at f2. In fact, the robot is spending 85% of its time exploring situations with sounds at f2 and rapidly learns how to improve its predictions of the distance to the toy in such situations.

After about 3000 time steps (actions) the active-learning management technique according to the third aspect of the present invention is the algorithm which has enabled the robot to learn most about the situations in which sounds are produced at f2. The mean prediction error using this algorithm stabilises at a low value of around 0.090. The mean prediction error produced by the MAX and MIN algorithms, respectively, remains at a substantially higher level (around 0.11). The mean prediction error produced by the RAN algorithm does, eventually, decrease to stabilise at a low value. However, this low value is around 0.092 which is still higher than the mean prediction error produced by the algorithm according to the present invention. Moreover, this low value is attained by the RAN algorithm after around 11000 actions. In other words, both the RAN algorithm and the algorithm according to the present invention enable the robot to learn about situations in which sounds are produced at frequency f2, but this learning is about 2.6 times faster when using the algorithm according to the third aspect of the present invention.

Although the various aspects of the present invention have been described above in terms of embodiments which are presently preferred, it is to be understood that the invention is not limited by the particular details of the preferred embodiments. In particular, the skilled person will readily appreciate that various changes and developments can be made in the preferred embodiment, within the scope of the annexed claims.

For example, although the prediction modules in the preferred embodiments of the invention use a nearest-neighbour prediction algorithm, the invention is not limited to the case where this algorithm is used. Similarly, although the action-selection module 4 of the preferred embodiments of the invention chooses random actions with a probability of 0.15, the invention is not limited to use of this probability value.

Also, although the region identifier used in preferred embodiments of the invention splits a region R into two or more smaller regions when the number of training examples in region R has reached a value NS=250, this number is merely illustrative, not limitative. Moreover, as indicated above, other splitting criteria could be used which do not count the number of training examples in a region.

Moreover, as indicated above, the distribution of functions between modules in the systems of FIGS. 4, 5 and 9 is purely illustrative. Other distributions of the described functions between the modules are possible and/or a greater or lesser number of modules could be used to perform the same functions—for example, one module could be used for defining regions in system-state/action/context space and another module could be used for identifying which region applies to a particular combination of system-state/context parameters and action variables. Moreover, it is not necessary to include distinct modules in the action-selection systems and training systems of the invention. The various functions of the preferred embodiments of the invention could be performed, for example, in a computer program, by one or more software modules having overlapping functions.

Also, the skilled person will readily appreciate that certain of the functions ascribed to the different modules in FIGS. 4, 5 and 9 can be replaced by other functions, or combinations of functions, having an equivalent result. For example, as shown in FIG. 4, the action selector 4 sends the calculator 5 of actual prediction error a signal indicating which action was actually selected for performance. The calculator 5 then retrieves the prediction relating to the action that has been selected for performance. However, the system 1 could be arranged such that calculator 5 receives all predictions made by the prediction modules 12 for a given set of candidate actions and identifies which of these predictions to use when assessing actual prediction error by studying the signal received from the action selector.

Furthermore, although the above description refers to distinct expert units, each assigned to calculate the expected knowledge-gain for different regions of system-state/context/action space, and refers to old expert units being split, or to new expert units being "created", this is not limitative. More particularly, it is to be understood that the important factor is that the knowledge gain should be assessed in an appropriate manner for each respective region in system-state/context/action space, whether this is achieved using an expandable set of distinct expert units, or using a single device (or software module) configured to load the prediction function, meta-prediction function and stored training example data applicable to the relevant region in system-state/context/action space, or using some other means.

Moreover, systems embodying the present invention could include a specific module for collating and storing the training example data and supplying it, as needed, to the expert unit handling the appropriate region in system-state/context/action space.

Furthermore, as indicated above the intelligent adaptive curiosity drive provided by the present invention can be just one of a plurality of drives motivating the selection of actions by a self-developing device. In such a case, the action-selection system 21 of FIG. 9 would not itself make the final selection of which action the robot would take. More especially, the action selection module 4 of FIG. 9 could be omitted and the knowledge-gain values produced by the various knowledge-gain assessment modules 14 could be output to a central controller as reward values indicating how desirable the associated candidate actions are considered to be. The central controller would process these reward values together with others generated by other drives motivating the robot's behaviour in order to decide which action the robot should take next. The central controller would send a signal to the module 21 indicating which candidate action has been selected, thus enabling actual prediction error to be calculated and stored in the memory 15 of the appropriate expert unit EXP.

Finally, it is to be understood that robotic devices, artificial intelligence systems, expert systems and the like are not limited to using only the third aspect of the invention. The first aspect of the present invention can be applied for selecting the actions to be taken by such devices and systems, even when these devices/systems do not form part of the setup S whose behaviour is being investigated. The second aspect of the present invention can be applied in order to train prediction machines included in these devices and systems, even when these devices/systems do not form part of the setup S whose behaviour is being learned.

The invention claimed is:

1. An automated action-selection system adapted to generate signals specifying values for a set of one or more action variables defining an action that can be taken whereby to affect a setup S, the automated action-selection system comprising:
   input means for receiving signals indicative of the value, at a time t, of a set of zero or more system-state/context parameters (SC(t)) describing the state and/or context of the setup S;
   a region definer adapted to define a set of regions in a multi-dimensional system-state/context/action space, each dimension of the system-state/context/action space being defined by a respective different parameter or variable of the sets of system-state/context parameters and action variables;
   means for determining a set of candidate actions, each candidate action consisting of a possible set of values for the action variables;
   a region identifier for identifying the region in system-state/context/action space containing the combination of a given candidate action with values of any system-state/context parameters at time t;

a prediction unit adapted to predict the value of a set of one or more predicted variables (VAR) a predetermined interval after time t, wherein a prediction function applied by the prediction unit depends upon the region in system-state/context/action space containing the combination of this given candidate action with any system-state/context parameters at time t;

calculator means adapted to calculate, for selected candidate actions, a respective indicator of the actual error in the prediction made by the prediction unit for said selected candidate action;

memory means for storing indicators of actual prediction errors made by the prediction unit for respective candidate actions selected on one or more previous occasions;

assessment means adapted to evaluate the expected improvement in the performance of the prediction unit if a given candidate action is performed, wherein an assessment performed by the assessment means depends upon the region R in system-state/context/action space containing the combination of this given candidate action with the values, at time t, of any system-state/context parameters, and the assessment means is further adapted to evaluate said expected improvement by comparing an indicator of the actual prediction error that existed on one or more occasions, previous to time t, when the setup S had a combination of system-state/context parameters and action variables located in the same region R of the system-state/context/action; and means for generating a signal indicating the desirability of selecting a given candidate action for performance, said signal being dependent on the expected improvement in the performance of the prediction unit evaluated by the assessment unit for said given candidate action.

2. The automated action-selection system according to claim 1, and comprising an action selector adapted to select an action for performance to affect the setup S, the action selector having a probability of p, where 0<p<1, of selecting that one of the set of candidate actions that the assessment unit evaluates to be expected to yield the greatest improvement in performance of the prediction unit;

wherein the action-selection system outputs data defining the action selected by the action selector.

3. The automated action-selection system according to claim 2, wherein the action selector has a probability of 1-p of selecting a random action for performance.

4. The automated action-selection system according to claim 1, wherein the region definer is adapted to define the regions in system- state/context/action space dynamically, wherein the region divider divides an existing region R into two or more new regions when a first criterion (C1) is met.

5. The automated action-selection system according to claim 4, and comprising counting means for counting the number of occasions on which an action is taken affecting the setup S and the combination of the action variable values defining said action with the values of system-state/context parameter values at the time said action is taken, falls within the region R;

wherein the first criterion (C1) is met when the counting means has counted up to a predetermined number (NS).

6. The automated action-selection system according to claim 1, and comprising meta prediction means adapted to evaluate the expected prediction error for predictions made by the prediction means; wherein the assessment means is adapted to evaluate the expected improvement in the performance of the prediction means if a given candidate action is performed by evaluating the decrease in prediction error that is expected to result from performance of said given candidate action.

7. The automated action-selection system according to claim 1, and comprising means for receiving feedback regarding the actual values of the predicted variables (VAR) resulting from performance of a given action;

the prediction means is responsive to the feedback data whereby to adapt the prediction function that is applied for candidate actions in the same region of system-state/context/action space as the region containing the combination of the action which produced the feedback data and values of any system-state/context parameters at the time when said given action was performed.

8. The automated action-selection system according to claim 7, and comprising memory means for storing training example data; for a given performed action said training example data comprising action variable values, any system-state/context parameter values applicable at the time said given action was performed, and feedback data defining the actual values of the set of predicted variables (VAR).

9. The automated action-selection system according to claim 8, wherein the region definer is adapted dynamically to define regions in system-state/context/action space and, when dividing a region R of system-state/context/action space into two or more new regions defines boundaries of the new regions so that there is a balance between the numbers of training examples in each new region, and the variance of the training examples is minimized in system-state/context/action space, or in a space defined by the set of predicted variables, or in a multi-dimensional space combining system-state/context/action space and said space defined by the set of predicted variables.

10. The automated action-selection system according to claim 1, wherein the prediction unit is adapted to make predictions by applying nearest-neighbours algorithms.

11. An automated prediction-machine-training system comprising an automated action-selection system according to claim 1, wherein the combination of the region identifier and the prediction unit of the automated action-selection system constitute a trainable prediction machine; the automated prediction-machine-training system comprising means for receiving feedback regarding the actual values of the predicted variables (VAR) resulting from performance of a given action; and wherein the prediction means is responsive to the feedback data whereby to adapt the prediction function that is applied for candidate actions in the same region of system-state/context/action space as the region containing the combination of the action which produced the feedback data and any system-state/context parameters applicable at the time when said given action was performed.

12. The automated prediction-machine-training system according to claim 11, and comprising:

monitoring means for monitoring the evolution of the respective prediction functions applied by the prediction unit for the different regions of system-state/context/action space; and an operation-mode setter adapted to change over operation of the prediction-machine-training system from a training mode to a prediction mode when the monitoring means determines that the rate of change of the prediction functions has fallen below a threshold level.

13. A prediction machine trained using the automated prediction-machine-training system of claim 11.

14. A computer system adapted to predict the value of a set of one or more predicted variables (VAR), said computer system having been trained using the automated prediction-machine-training system of claim 11.

15. An expert system adapted to predict the value of a set of one or more predicted variables (VAR), said computer system having been trained using the automated prediction-machine-training system of claim 11.

16. An automated action-selection system for a robot or other self-developing device or system, the action-selection system being according to any claim 1, wherein the robot or other self-developing device or system is arranged to perform actions affecting the setup S.

17. An automated action-selection system for a self-developing robot or other self-developing device or system, according to claim 16, and comprising means for supplying the signal indicating the desirability of selecting a given candidate action for performance to a decision-making unit which selects the actions to be performed by the self-developing device or system.

18. An automated action-selection system for a self-developing robot or other self-developing device or system, according to claim 16, wherein the action-selection system is separate from, but in communication with the self-developing device or system.

19. A self-developing robot, or other self-developing device or system, comprising an automated action-selection system according to claim 16.

20. A self-developing robot, or other self-developing device or system, trained by having been caused to participate in the selection and performance of a series of actions, actions in the series having been selected using the automated action-selection system of any claim 16.

21. An automated action-selection method making use of an automated action-selection system according to claim 1, the automated action-selection method comprising the steps of:

providing the automated action-selection system; and
inputting to the action-selection system signals indicative of the value, at a time t, of a set of zero or more system-state/context parameters (SC(t)) describing the state and/or context of the setup S.

22. The automated action-selection method according to claim 21, and comprising the step of feeding back to the action-selection system data indicative of the actual values of the predicted variables (VAR) resulting from performance of a given action, and data indicative of the applicable values of any system-state/context parameters at the time said given action was performed, wherein the prediction means is responsive to the feedback data whereby to adapt the prediction function that is applied for candidate actions in the same region of system-state/context/action space as the region containing the combination of the action which produced the feedback data and any system-state/context parameters applicable at the time when said given action was performed.

23. An automated prediction-machine-training method comprising the automated action-selection method according to claim 22, wherein the combination of the region identifier and the prediction unit of the action-selection system constitute a trainable prediction machine.

24. An automated action-selection method for a robot or other self-developing device or system, the automated action-selection method being according to claim 21, wherein the robot or other self-developing device or system is arranged to perform actions affecting the setup S.

25. An automated action-selection method for a robot or other self-developing device or system, according to claim 24, and comprising the step of supplying the signal indicating the desirability of selecting a given candidate action for performance to a decision-making unit which selects the actions to be performed by the self-developing device or system.

* * * * *